(12) United States Patent
Ikeda et al.

(10) Patent No.: US 11,361,541 B2
(45) Date of Patent: Jun. 14, 2022

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Takuya Ikeda, Tokyo (JP); Fumihiko Iida, Kanagawa (JP); Kentaro Ida, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/964,030

(22) PCT Filed: Dec. 4, 2018

(86) PCT No.: PCT/JP2018/044471
§ 371 (c)(1),
(2) Date: Jul. 22, 2020

(87) PCT Pub. No.: WO2019/171685
PCT Pub. Date: Sep. 12, 2019

(65) Prior Publication Data
US 2021/0042526 A1 Feb. 11, 2021

(30) Foreign Application Priority Data
Mar. 7, 2018 (JP) .............................. JP2018-040920

(51) Int. Cl.
*G06T 7/20* (2017.01)
*G06V 20/20* (2022.01)
(Continued)

(52) U.S. Cl.
CPC ................ *G06V 20/20* (2022.01); *A63F 7/07* (2013.01); *G06T 7/20* (2013.01); *G06T 7/70* (2017.01); *A63F 2250/10* (2013.01); *G06F 3/14* (2013.01)

(58) Field of Classification Search
CPC .. A63F 7/07; A63F 13/25; A63F 13/57; A63F 13/812; A63F 13/52; A63F 7/0632;
(Continued)

(56) References Cited

U.S. PATENT DOCUMENTS

| 2011/0169867 A1* | 7/2011 | Kniffen ............... G06F 3/04855 345/660 |
| 2015/0330804 A1* | 11/2015 | Okuda ................ G09B 29/007 701/487 |
| 2016/0049009 A1* | 2/2016 | Hara ..................... G06T 19/006 345/633 |

FOREIGN PATENT DOCUMENTS

| JP | 2012-029750 A | 2/2012 |
| JP | 2012029750 A * | 2/2012 |

OTHER PUBLICATIONS

Yamaguchi, et al., "LumoSpheres: Video projection based on real-time tracking of multiple floating objects", 21st Workshop on Interactive Systems and Software (WISS 2013), URL: https://www.wiss.org/WISS2013Proceedings/oral/S3_011.pdf, Dec. 1, 2013, 17 pages.

(Continued)

*Primary Examiner* — Syed Haider
(74) *Attorney, Agent, or Firm* — Chip Law Group

(57) ABSTRACT

An information processing apparatus includes an acquisition unit that acquires information indicating an estimation result of movement of a predetermined target object in accordance with a history of chronological detection results of positions of the target object and a recognition result of a surrounding environment of the target object, and a control unit that causes display information to be presented in a display mode corresponding to the estimation result.

17 Claims, 25 Drawing Sheets

(51) Int. Cl.
*G06T 7/70* (2017.01)
*A63F 7/07* (2006.01)
*G06F 3/14* (2006.01)

(58) Field of Classification Search
CPC ......... A63F 2250/10; A63F 2009/2463; G06T 7/20; G06T 7/70; G06F 3/0425; G06F 3/14; G06K 9/00671; G06V 20/20
See application file for complete search history.

(56) References Cited

OTHER PUBLICATIONS

Kaku, et al., "Amazing Projection Mapping Attaches to Billowing Cloth and Moving Ball", FUTURUS, URL: https://nge.jp/2016/11/20/post-136227, Feb. 12, 2016, 10 pages.

International Search Report and Written Opinion of PCT Application No. PCT/JP2018/044471, dated Feb. 26, 2019, 09 pages of ISRWO.

Yamaguchi, et al., "LumoSpheres: Video projection based on real-time tracking of multiple floating objects", WISS, URL: https://www.wiss.org/WISS2013Proceedings/oral/S3_011.pdf, Dec. 1, 2013, 17 pages.

* cited by examiner

FIG.15
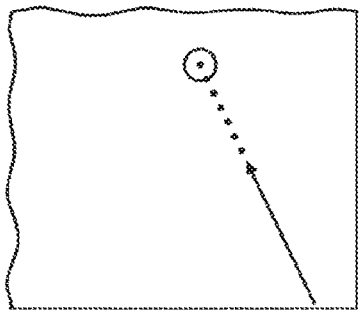
EXPRESSION IN WHICH WALL
SURFACE HAS ELASTICITY
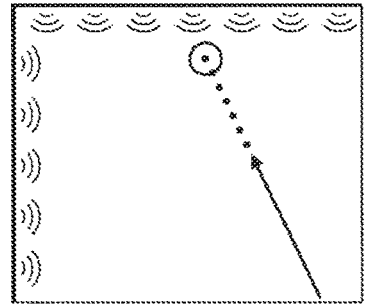
EXPRESSION IN WHICH REPULSIVE
FORCE OCCURS FROM WALL SURFACE
FIG.16
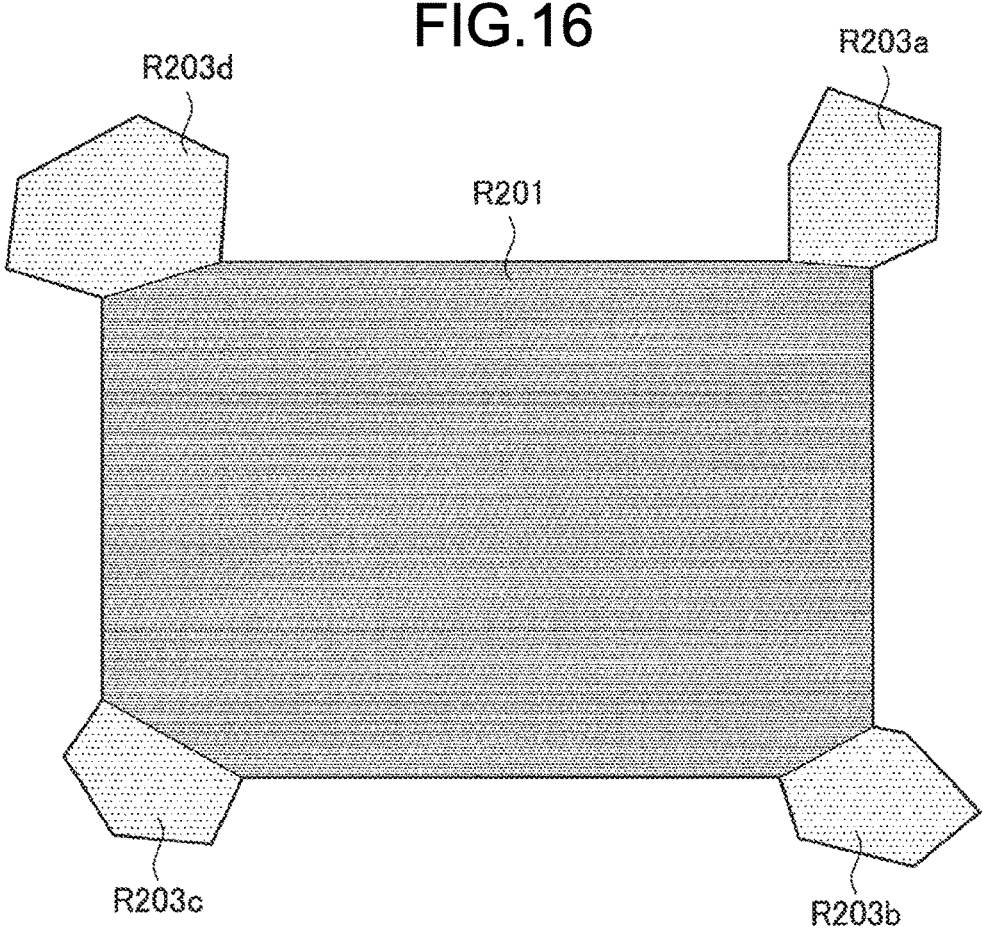

FIG.17
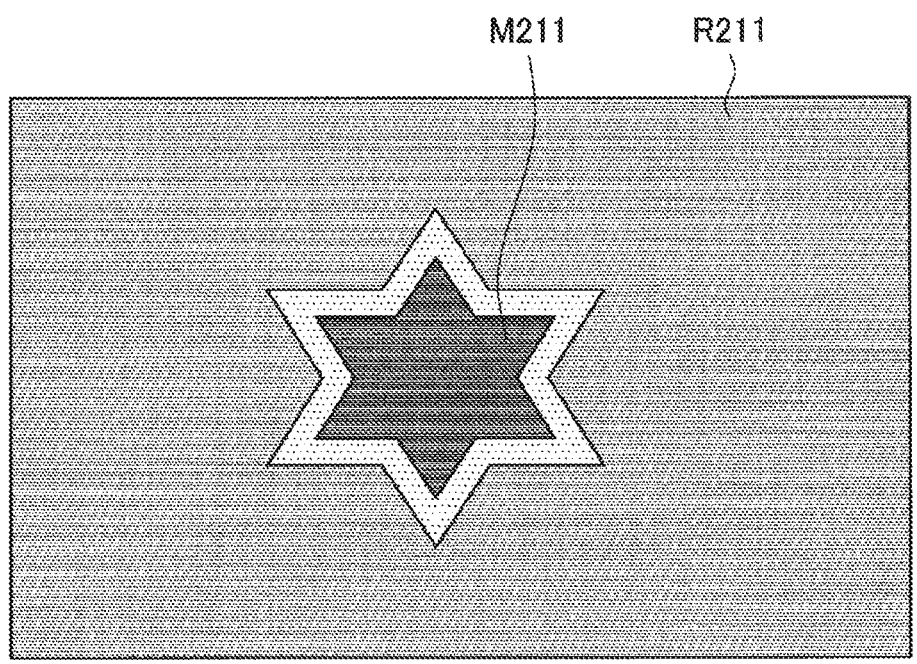
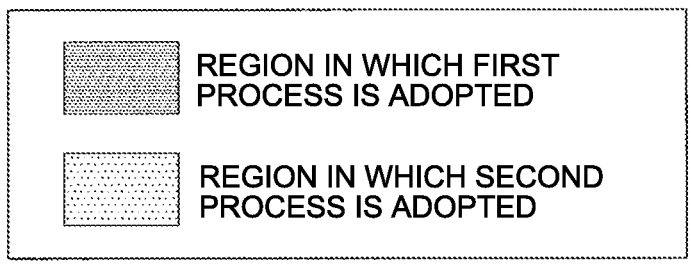

INFORMATION PROCESSING APPARATUS, INFORMATION PROCESSING METHOD, AND RECORDING MEDIUM

CROSS REFERENCE TO RELATED APPLICATIONS

This application is a U.S. National Phase of International Patent Application No. PCT/JP2018/044471 filed on Dec. 4, 2018, which claims priority benefit of Japanese Patent Application No. JP 2018-040920 filed in the Japan Patent Office on Mar. 7, 2018. Each of the above-referenced applications is hereby incorporated herein by reference in its entirety.

FIELD

The present disclosure relates to an information processing apparatus, an information processing method, and a recording medium.

BACKGROUND

Various technologies capable of providing various experiments to a user by presenting various kinds of information in accordance with user input have been proposed. For example, Patent Literature 1 discloses an example of a technology for presenting, in what is called an air hockey game device, a produced image that indicates a predicted path of a puck in accordance with movement of the puck on a table in order to bring excitement to the game.

CITATION LIST

Patent Literature

Patent Literature 1: JP 2012-29750 A

SUMMARY

Technical Problem

Meanwhile, a circumstance in which movement of an object in a real space is changed in accordance with a surrounding environment of the object may sometimes occur. In view of the circumstance as described above, for example, if presentation of various kinds of information to a user is controlled in accordance with a change of movement of a predetermined target object (object) in a real space, an effect of making it possible to provide a new experiment to a user is expected to be achieved.

Therefore, in the present disclosure, a technology capable of providing a more preferable user experience is proposed.

Solution to Problem

According to the present disclosure, an information processing apparatus is provided that includes: an acquisition unit configured to acquire information indicating an estimation result of movement of a predetermined target object in accordance with a history of chronological detection results of positions of the target object and a recognition result of a surrounding environment of the target object; and a control unit configured to cause display information to be presented in a display mode corresponding to the estimation result.

Moreover, according to the present disclosure, an information processing method implemented by a computer is provided that includes: acquiring information indicating an estimation result of movement of a predetermined target object in accordance with a history of chronological detection results of positions of the target object and a recognition result of a surrounding environment of the target object; and causing display information to be presented in a display mode corresponding to the estimation result.

Moreover, according to the present disclosure, a recording medium is provided that stores a program causing a computer to execute: acquiring information indicating an estimation result of movement of a predetermined target object in accordance with a history of chronological detection results of positions of the target object and a recognition result of a surrounding environment of the target object; and causing display information to be presented in a display mode corresponding to the estimation result.

Advantageous Effects of Invention

As described above, according to the present disclosure, it is possible to provide a technology capable of providing a more preferable user experience.

Meanwhile, the effects described above are merely illustrative or exemplified effects, and are not limitative. That is, with or in the place of the above effects, any of the effects described in this specification or other effects that can be recognized from this specification may be achieved.

BRIEF DESCRIPTION OF DRAWINGS

FIG. 15 is an explanatory diagram for explaining still another example of the presentation mode of the information that is presented by the information processing apparatus according to the second modification in accordance with the estimation result of the movement of the target object.

FIG. 16 is an explanatory diagram for explaining an example of a method of estimating movement of a target object by an information processing apparatus according to a third modification.

FIG. 17 is an explanatory diagram for explaining another example of the method of estimating the movement of the target object by the information processing apparatus according to the third modification.

DESCRIPTION OF EMBODIMENTS

Preferred embodiments of the present disclosure will be described in detail below with reference to the accompanying drawings. In the present specification and the drawings, structural elements that have substantially the same functions and configurations will be denoted by the same reference symbols, and repeated explanation of the structural elements will be omitted.

In addition, hereinafter, explanation will be given in the following order.
   1. System configuration
   2. Functional configuration
   3. Processes
   4. Modifications
      4.1. First modification: another example of method of estimating movement of target object
      4.2. Second modification: example of visual expression
      4.3. Third modification: example of control on estimation of movement of target object
   5. Application examples
      5.1. First application example: example of extension to three-dimensional processes
      5.2. Second application example: example of application to writing input system
      5.3. Third application example: example of application to AR technology
   6. Hardware configuration
   7. Conclusion

1. SYSTEM CONFIGURATION

Figure 1:
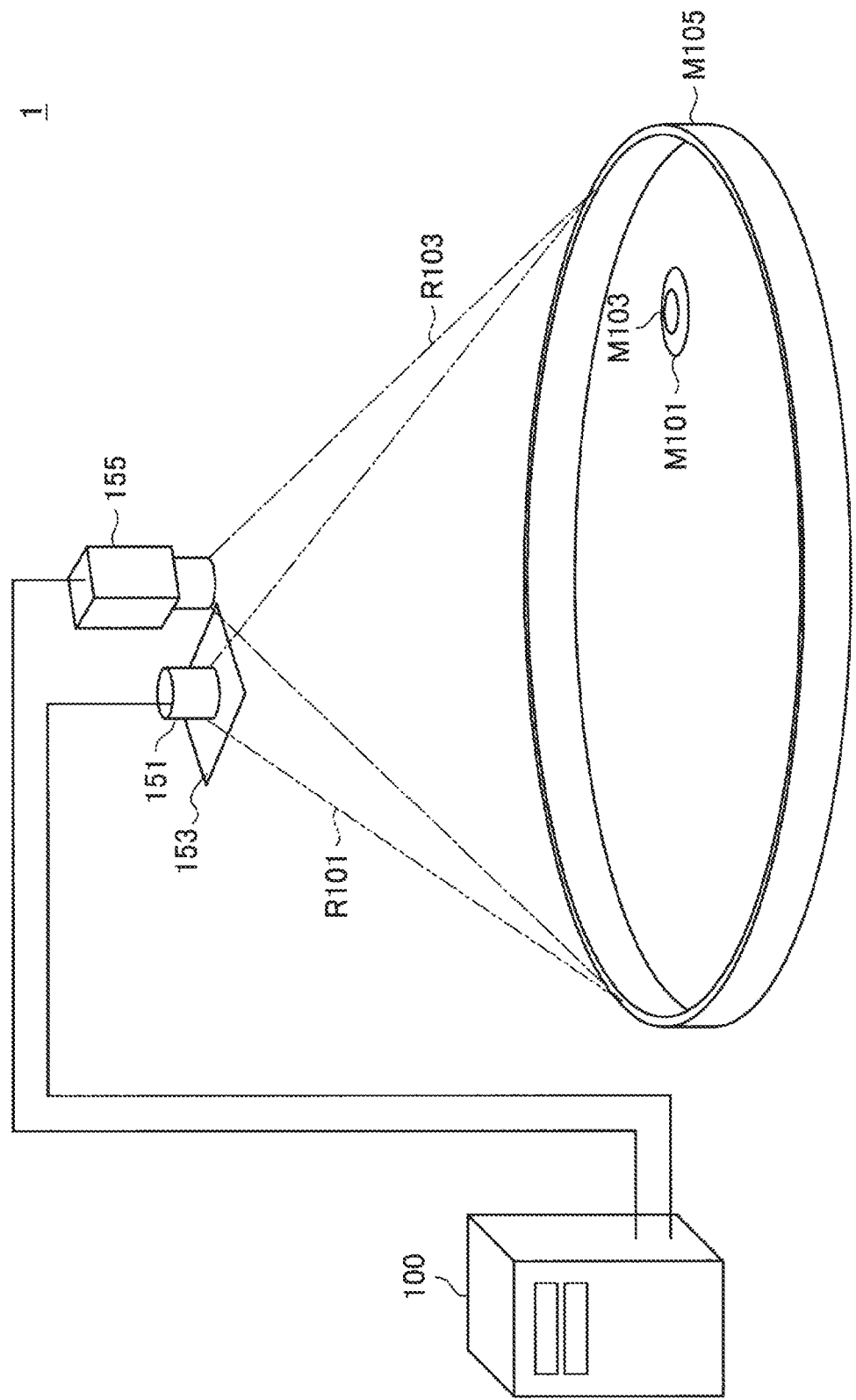
FIG. 1 is an explanatory diagram for explaining an example of a system configuration of an information processing system according to one embodiment of the present disclosure.

First, an example of a system configuration of an information processing system according to one embodiment of the present disclosure will be described with reference to FIG. 1. FIG. 1 is an explanatory diagram for explaining an example of the system configuration of the information processing system according to one embodiment of the present disclosure. In the example illustrated in FIG. 1, an exemplary case in which the information processing system according to the present embodiment is implemented as a game system for what is called an air hockey is illustrated. Specifically, an information processing system 1 recognizes, as a predetermined target object, a puck M101 that is arranged on a stage M105 in the form of a predetermined shape, and projects a video on the stage M105 in accordance with a recognition result of movement of the puck M101, to thereby provide a new experience to a user.

Specifically, as illustrated in FIG. 1, the information processing system 1 according to the present embodiment includes an information processing apparatus 100, an imaging unit 151, and an output unit 155. Further, the information processing system 1 may include a projector unit 153.

The imaging unit 151 captures an image of a subject in a predetermined region (i.e., in an imaging range), and outputs the captured image to the information processing apparatus 100. In FIG. 1, a reference symbol R101 schematically denotes the imaging range of the imaging unit 151 (in other words, an angle of view of the imaging unit 151). That is, in the example illustrated in FIG. 1, the stage M105 is arranged so as to be located inside the imaging range R101 of the imaging unit 151. With this configuration, in a circumstance in which the puck M101 is arranged on the stage M105, the puck M101 is captured as the subject in the above-described image. That is, by analyzing the image, it is possible to detect a position of the puck M101 on the stage M105.

Further, it may be possible to use light with a predetermined wavelength, such as infrared light (IR), to detect the puck M101. For example, the projector unit 153 includes a light source that emits infrared light, and applies the infrared light to the inside of a predetermined region. In the example illustrated in FIG. 1, the stage M105 is arranged so as to be located in a range to which the projector unit 153 applies the infrared light. Further, in the example illustrated in FIG. 1, a retroreflective marker M103 that reflects the infrared light is attached to a surface of the puck M101. With this configuration, if the projector unit 153 applies the infrared light toward the stage M105, a part of the infrared light is reflected by the retroreflective marker M103 attached to the puck M101, and reflected light (infrared light) is detected by the imaging unit 151. That is, it is possible to detect a position of the puck M101 on the stage M105 in accordance with a position at which the reflected light is detected in the imaging range (in the angle of view) of the imaging unit 151.

The output unit 155 corresponds to what is called a projector, and projects information as a video (display information) in a predetermined region, to thereby present the information. In FIG. 1, a reference symbol R103 schematically denotes a range (hereinafter, also referred to as an "output range") in which the video is projected by the output unit 155. For example, in the example illustrated in FIG. 1, the stage M105 is arranged so as to be located inside the output range R103 of the output unit 155. With this configuration, the output unit 155 is able to project a video at a desired position in the stage M105.

Further, the output unit 155 may include a configuration for presenting information by a method different from video projection. As a specific example, the output unit 155 may include an acoustic output unit, such as a speaker. With this configuration, the output unit 155 is able to present information as sound (for example, music, sound effects, or the like) or voice.

With the configuration as described above, the information processing apparatus 100 performs the analysis process as described above on the image captured by the imaging unit 151, and recognizes a predetermined target object (i.e., the puck M101) that is captured as a subject in the image. Further, in this case, the information processing apparatus 100 may acquire a history of chronological detection results of positions of the puck M101 by sequentially analyzing images that are sequentially captured by the imaging unit 151. By analyzing the history acquired as described above, the information processing apparatus 100 estimates movement of the puck M101 at and after a timing at which the image of the puck M101 is captured (i.e., a timing at which the position of the puck M101 is detected). Then, the information processing apparatus 100 controls operation of the output unit 155 such that a desired video is projected at a desired position in the stage M105 in accordance with an estimation result of movement of the puck M101. With this control, for example, it becomes possible to cause the output unit 155 to project a desired video such that the video is superimposed on the puck M101 that moves around inside the stage M105. Meanwhile, in the following explanation, an object, such as the puck M101 as illustrated in FIG. 1, as a target whose movement is to be estimated by the information processing apparatus 100 may be simply referred to as a "target object" for the sake of convenience. Therefore, in the following explanation, the "target object" indicates an object as a target whose movement is to be estimated by the information processing apparatus 100, unless otherwise specified.

Furthermore, the information processing apparatus 100 according to the present embodiment may recognize a surrounding environment of the target object (for example, the puck M101), and estimate movement of the target object by taking into account the environment. For example, in the example illustrated in FIG. 1, the information processing apparatus 100 may recognize an outer wall of the stage M105 by analyzing the image captured by the imaging unit 151, and may be able to estimate a change of movement of the puck M101 due to a hit of the puck M101 against the outer wall. With this configuration, the information processing apparatus 100 is able to cause a desired video to be superimposed on the puck M101 by taking into account a change of movement of the puck M101 due to a hit against a wall surface. Moreover, as another example, the information processing apparatus 100 is also able to project a desired video (for example, a video representing a hit in a produced manner) at a position at which the puck M101 hits against the wall surface in synchronization with a timing at which the puck M101 hits against the wall surface, or control a display mode of a video that is superimposed on the puck M101.

Furthermore, the information processing apparatus 100 may estimate a material of a bottom surface of the stage M105 in accordance with a recognition result of the bottom surface, and estimate friction between the puck M101 that moves around and the bottom surface. Accordingly, the information processing apparatus 100 is also able to estimate a change of movement of the puck M101 in accordance with a frictional force that acts between the puck M101 and the bottom surface of the stage M105.

As described above, in the system 1 according to one embodiment of the present disclosure, the information processing apparatus 100 estimates movement of a target object by using a history of chronological detection results of positions of the target object in a real space. Further, in this case, the information processing apparatus 100 may recognize a surrounding environment of the above-described target object, and estimate movement of the target object in accordance with a recognition result of the environment, in particular, in accordance with a recognition result of an external factor that is estimated to affect motion of the target object. Then, the information processing apparatus 100 causes information (for example, display information, such as a video) to be presented in accordance with an estimation result of the movement of the target object as described above. As a specific example, the information processing apparatus 100 may cause the display information to be presented at a position corresponding to the estimation result of the movement of the target object. Further, as another example, the information processing apparatus 100 may cause the display information to be presented in a display mode corresponding to the estimation result of the movement of the target object. With this configuration, the information processing system according to the present embodiment is able to provide various experiments to a user in a more preferred mode.

Meanwhile, the system configuration illustrated in FIG. 1 is a mere example, and does not limit the system configuration of the information processing system 1 according to the present embodiment. As a specific example, at least two or more components among the components included in the information processing system 1 may be configured in an integrated manner. As a specific example, the imaging unit 151, the projector unit 153, and the output unit 155 may be configured in an integrated manner. Further, functions of the information processing apparatus 100 may be implemented by a plurality of devices that operate in cooperation with one another.

Thus, one example of the system configuration of the information processing system according to one embodiment of the present disclosure has been described above with reference to FIG. 1.

2. FUNCTIONAL CONFIGURATION

Next, one example of a functional configuration of the information processing system according to one embodiment of the present disclosure will be described with particular focus on a functional configuration of the information processing apparatus 100. For example, FIG. 2 is a block diagram illustrating an example of the functional configuration of the information processing system according to the present embodiment.

Figure 2:
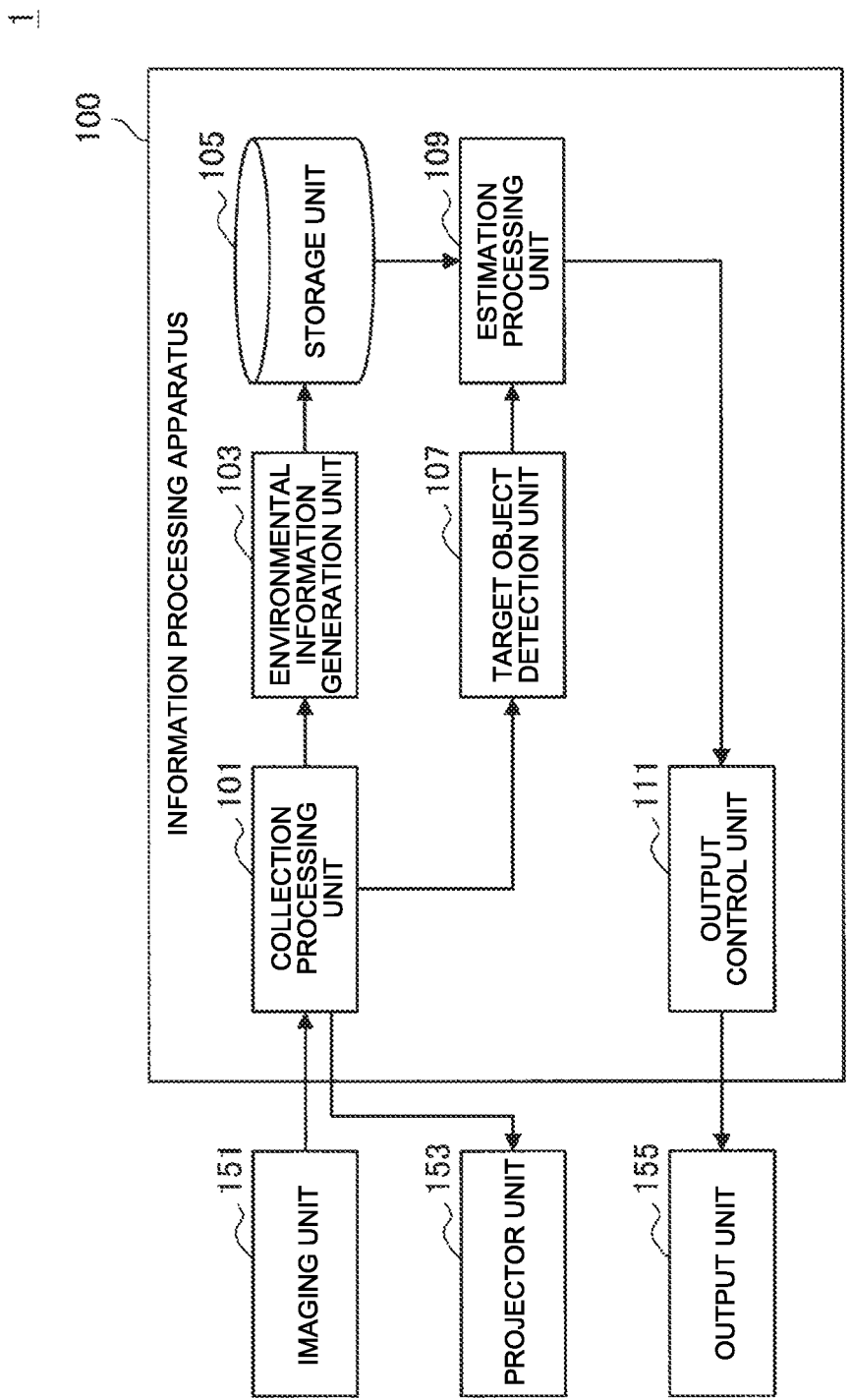
FIG. 2 is a block diagram illustrating an example of a functional configuration of the information processing system according to one embodiment.

In FIG. 2, the information processing apparatus 100, the imaging unit 151, the projector unit 153, and the output unit 155 correspond to the information processing apparatus 100, the imaging unit 151, the projector unit 153, and the output unit 155 illustrated in FIG. 1. Further, as illustrated in FIG. 2, the information processing apparatus 100 includes a collection processing unit 101, an environmental information generation unit 103, a storage unit 105, a target object detection unit 107, an estimation processing unit 109, and an output control unit 111.

The collection processing unit 101 collects information for recognizing a target object in a predetermined region and a surrounding environment of the target object. As a specific example, the collection processing unit 101 sequentially acquires images captured by the imaging unit 151 from the imaging unit 151 for each predetermined frame. Further, the collection processing unit 101 may control operation of the projector unit 153 such that the projector unit 153 applies infrared light to the inside of the imaging range of the imaging unit 151 in accordance with a timing at which the imaging unit 151 captures an image. With this configuration, for example, as in the example illustrated in FIG. 1, if the retroreflective marker M103 is attached to the puck M101 that is adopted as a target object, infrared light reflected by the retroreflective marker M103 is captured in the image. Then, the collection processing unit 101 outputs the collected information (for example, the image captured by the imaging unit 151) to the environmental information generation unit 103 and the target object detection unit 107.

Meanwhile, in the following, it is mainly explained that an object, such as a target object, in a real space and a surrounding environment of the object are recognized based on the image captured by the imaging unit 151, but a configuration for the recognition is not specifically limited as long as it is possible to recognize the object and the environment. As a specific example, it may be possible to recognize an object in a real space and a surrounding environment of the object by measuring a distance to the object by using a depth sensor, a ranging sensor, or the like. Meanwhile, examples of a method of measuring (estimating) a distance to an object in a real space include methods based on certain technologies, such as a multi-camera stereo, movement parallax, Time Of Flight (TOF), Structured Light, and the like. Further, the example has been described above in which the imaging unit 151 detects infrared light that is applied by the projector unit 153 and reflected by the target object, but a configuration for detecting the infrared light may be arranged separately from the imaging unit 151. As a specific example, it may be possible to effectively detect infrared light reflected by a target object by separately arranging an imaging unit in which a filter for blocking visible light is used. Furthermore, it may be possible to use various sensors, such as an optical sensor or a magnetic sensor, to acquire information for recognizing an object (for example, the target object as described above) in a real space and a surrounding environment of the object. Moreover, it may be possible to improve recognition accuracy by using a plurality of kinds of information to recognize an object in a real space and a surrounding environment of the object.

The environmental information generation unit 103 recognizes the surrounding environment of the target object in a predetermined region (for example, in the imaging range of the imaging unit 151), on the basis of various kinds of information collected by the collection processing unit 101. As a specific example, the environmental information generation unit 103 may recognize an external factor, such as a different object other than the target object, which is estimated to affect motion of the target object. As a more specific example, the environmental information generation unit 103 may perform image analysis on the image captured by the imaging unit 151, and recognize the outer wall of the stage M105 that is captured as a subject in the image as a surrounding environment of the puck M101 as the target object (i.e., an external factor that is estimated to affect motion of the puck M101). Furthermore, it may be possible to refer to environmental information that is generated in advance. Examples of a method of generating the environmental information in advance include a method of capturing dimensional data, such as CAD data, and a method of using environmental information on a similar environment. Meanwhile, it may be possible to appropriately change the information used for recognizing the external factor and the recognition method in accordance with the external factor that is to be recognized by the environmental information generation unit 103.

Moreover, in the example illustrated in FIG. 1, the imaging unit 151, the projector unit 153, and the output unit 155 are fixedly held at predetermined positions, but the imaging unit 151, the projector unit 153, and the output unit 155 may be movably held. In this cases, it may be possible to recognize surrounding environments of the imaging unit 151, the projector unit 153, and the output unit 155 by using what is called a self-position estimation technique, and recognize a surrounding environment of a target object.

Here, as a more specific example of the technology related to self-position estimation, an overview of a technique called simultaneous localization and mapping (SLAM) will be described. SLAM is a technique for simultaneously performing self-position estimation and generation of a map of an environment by using an imaging unit, such as a camera, various sensors, an encoder, and the like. As a more specific example, in SLAM (in particular, Visual SLAM), a three-dimensional shape of a captured scene (or subject) is sequentially reconstructed on the basis of a moving image captured by the imaging unit. Then, a reconstruction result of the captured scene is associated with a detection result of a position and a pose of the imaging unit, so that a map of a surrounding environment is generated and the position and the pose of the imaging unit in the environment are estimated. Meanwhile, as for the position and the pose of the imaging unit, it may be possible to arrange various sensors, such as an acceleration sensor and an angular velocity sensor, in a device that holds the imaging unit, and estimate the position and the pose as information that indicates a relative change based on detection results of the sensors. If it is possible to estimate the position and the pose of the imaging unit, an estimation method is, of course, not always limited to only the method based on the detection results of the various sensors, such as an acceleration sensor and an angular velocity sensor.

Then, the environmental information generation unit 103 stores, in a predetermined storage region (for example, the storage unit 105), information corresponding to a recognition result of a surrounding environment of a predetermined target object in a predetermined region.

The storage unit 105 is a storage region for temporarily or permanently storing various kinds of data. For example, the storage unit 105 may store therein data used by the information processing apparatus 100 to implement various functions. As a specific example, the storage unit 105 may store therein data (for example, a library) for executing various applications, management data for managing various kinds of setting, or the like. Further, as described above, the storage unit 105 may store therein information corresponding to an environment recognition result obtained by the environmental information generation unit 103.

The target object detection unit 107 detects a position of a target object in a predetermined region (for example, in the imaging range of the imaging unit 151), on the basis of various kinds of information collected by the collection processing unit 101. Further, in this case, the target object detection unit 107 may sequentially detect positions of the target object on the basis of information that is sequentially collected for each predetermined frame by the target object detection unit 107, and store detection results of the positions of the target object for the respective frames as a history in a chronological order.

Figure 3:
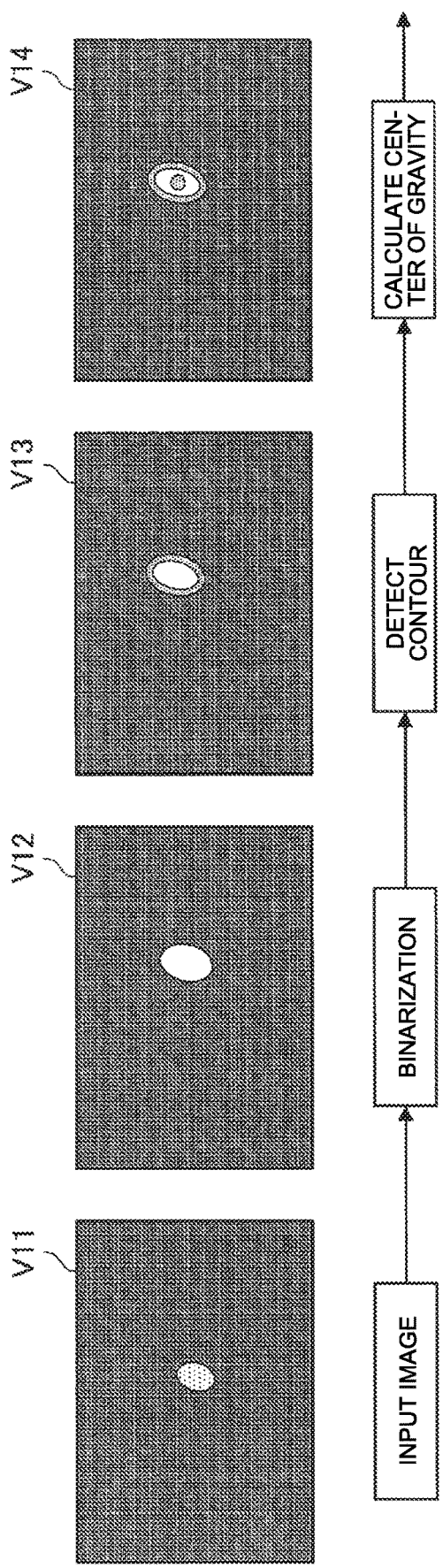
FIG. 3 is an explanatory diagram for explaining an example of a method of detecting a position of a target object.

Here, with reference to FIG. 3, as an example of a method of detecting the position of the target object in the predetermined region, an example of the method of detecting the position of the target object by using a detection result of infrared light that is applied by the projector unit 153 and reflected by the target object will be described. FIG. 3 is an explanatory diagram for explaining an example of the method of detecting the position of the target object. Specifically, in the example illustrated in FIG. 3, an IR image of the inside of the above-described predetermined region, which is captured by an imaging unit in which a filter for blocking visible light is applied, is used as information for detecting the position of the target object. For example, in FIG. 3, an input image denoted by a reference symbol V11 is an example of the IR image. As illustrated in FIG. 3, in the input image V11, infrared light reflected by the target object is captured as a subject.

The target object detection unit 107 performs a binarization process on the input image V11. For example, a reference symbol V12 denotes an image (hereinafter, also referred to as a "binary image V12") that is obtained by performing the binarization process on the input image V11. By performing binarization as described above, a contour of the reflected light (infrared light) that is captured as the subject is enhanced as compared to the input image V11. By using the characteristics as described above, the target object detection unit 107 performs an image analysis on the binary image V12, and extracts the contour of the infrared light that is captured as the subject. For example, a reference symbol V13 denotes a contour extraction result of the reflected light, which is captured as the subject, from the binary image V12. Subsequently, the target object detection unit 107 identifies a position of the center of gravity of the reflected light that is captured as the subject, on the basis of the contour extraction result V13. A reference symbol V14 schematically denotes the center of gravity of the contour that is identified based on the contour extraction result. The target object detection unit 107 detects, as the position of the target object (for example, the puck M101 illustrated in FIG. 1), the position of the center of gravity that is identified as described above.

Meanwhile, the example explained above with reference to FIG. 3 is a mere example, and does not limit contents of processes that are performed by the target object detection unit 107 to detect the position of the target object. As a specific example, it may be possible to add a color marker to a target object, and the target object detection unit 107 may detect a position of the target object by extracting the color marker through a color extraction process or the like from a color image that is captured by the imaging unit. Further, as another example, the target object detection unit 107 may detect a position of a target object by extracting the target object from an image captured by the imaging unit, on the basis of a feature amount or the like of a characteristic shape (for example, an edge or the like) of the target object.

Furthermore, if a position is to be detected so as to follow a target object, it may be possible to control a search range of the target object (subject) in a detection target image. For example, when the target object detection unit 107 detects a position of a target object in a certain frame, the target object detection unit 107 may adopt a position of the target object that has been detected in a frame prior to the certain frame as a base point, and performs a search preferentially from a neighboring point of the base point. Moreover, as another example, when the target object detection unit 107 detects a position of a target object in a certain frame, the target object detection unit 107 may calculate movement of the target object as a vector on the basis of a detection result of the position of the target object in a frame prior to the certain frame, and perform a search preferentially in a vector direction. Through the control as described above, the target object detection unit 107 is able to effectively detect a target object (subject) from an image without performing a search in the entire image.

Then, the target object detection unit 107 sequentially outputs information corresponding to detection results of the positions of the target object in a predetermined region (in other words, information corresponding to the history of the detection results of the positions of the target object) to the estimation processing unit 109 for each predetermined frame as described above.

The estimation processing unit 109 estimates movement of the target object in and after the latest frame in which the position is detected (i.e., a timing at which the target object is actually located at the detected position), on the basis of the information corresponding to the history of the detection results of the positions of the target object, where the information is sequentially output by the target object detection unit 107 for each predetermined frame. For example, FIG. 4 is an explanatory diagram for explaining an overview of a process of estimating movement of the target object in accordance with the history of the detection results of the positions of the target object.

Figure 4:
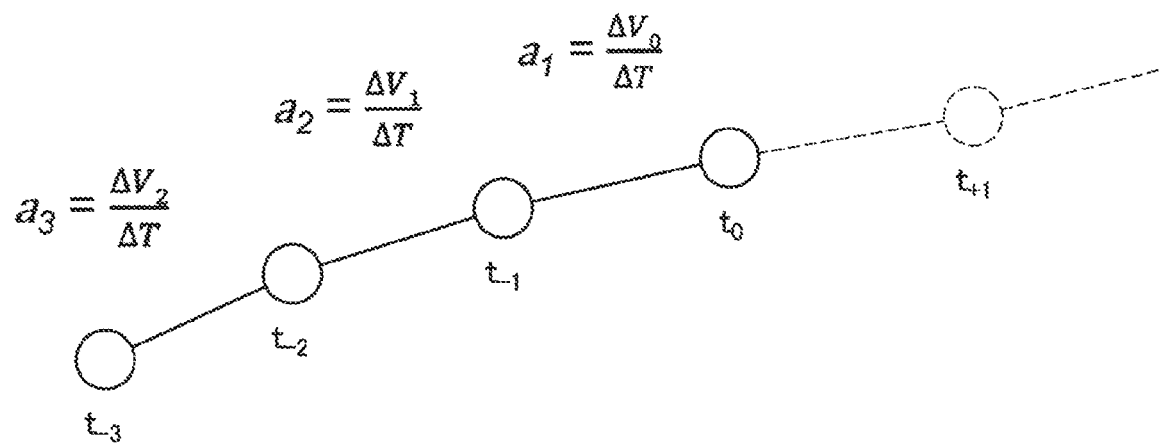
FIG. 4 is an explanatory diagram for explaining an overview of a process of estimating movement of the target object in accordance with a history of detection results of positions of the target object.

In FIG. 4, reference symbols $t_{-3}$, $t_{-2}$, $t_{-1}$, $t_0$, and $t_{+1}$ schematically denote frames (in other words, timings at which positions are detected), in each of which information used for detecting the position of the target object is acquired, in order from the oldest to the newest. Meanwhile, in the following explanation, for the sake of convenience, it is assumed that the frame $t_0$ is the latest frame in which the position of the target object is detected (in other words, the latest timing among timings of detection of the position of the target object). Further, in FIG. 4, a marker associated with each of the reference symbols $t_0$, $t_{-1}$, $t_{-2}$, and $t_{-3}$ schematically denotes a detection result of the position of the target object in each of the frames $t_0$, $t_{-1}$, $t_{-2}$, and $t_{-3}$.

Here, it is assumed that changes of velocity of the target object between the frames $t_{-1}$ and $t_0$, between the frames $t_{-3}$ and $t_{-2}$, and between the frames $t_{-2}$ and $t_{-1}$ are denoted by $\Delta V_0$, $\Delta V_2$, and $\Delta V_1$, and a temporal difference between the adjacent frames is denoted by $\Delta T$. In this case, acceleration $a_1$, $a_2$, and $a_3$ of the target object between the frames $t_{-1}$ and $t_0$, between the frames $t_{-3}$ and $t_{-2}$, and between the frames $t_{-2}$ and $t_{-1}$ are represented by calculation formulas denoted by (Expression 1-1) to (Expression 1-3) below.

$$a_1 = \frac{\Delta V_0}{\Delta T} \quad (1\text{-}1)$$

$$a_2 = \frac{\Delta V_1}{\Delta T} \quad (1\text{-}2)$$

$$a_3 = \frac{\Delta V_2}{\Delta T} \quad (1\text{-}3)$$

Further, if the position of the target object in an n-th frame from the latest frame $t_0$ is adopted as a predicted point, a coordinate $P(x_n, y_n)$ of the predicted point is represented by a calculation formula denoted by (Expression 2) below. Meanwhile, in (Expression 2), $x_0$ and $y_0$ correspond to an x-coordinate and a y-coordinate of the position of the target object in the frame $t_0$. Similarly, $x_{-1}$ and $y_{-1}$ correspond to an x-coordinate and a y-coordinate of the position of the target object in a frame $t_{-1}$.

$$P(x_n, y_n) = \text{diff}(x_0 - x_{-1}, y_0 - y_{-1}) + \Sigma a_n \quad (2)$$

As described above, the estimation processing unit 109 estimates the positions of the target object in and after the latest frame $t_0$ (i.e., calculates the predicted points). A method of estimating the predicted points as described above is a mere example, and the method of estimating the predicted points is not specifically limited as long as it is possible to estimate the predicted points on the basis of the detection results of the positions of the target object.

Further, when calculating the predicted points, the estimation processing unit 109 may take into account a recognition result of a surrounding environment of the target object. Specifically, the estimation processing unit 109 may use information corresponding to the recognition result of the surrounding environment of the target object stored in a predetermined storage region (for example, the storage unit 105) when calculating the predicted points.

Figure 5:
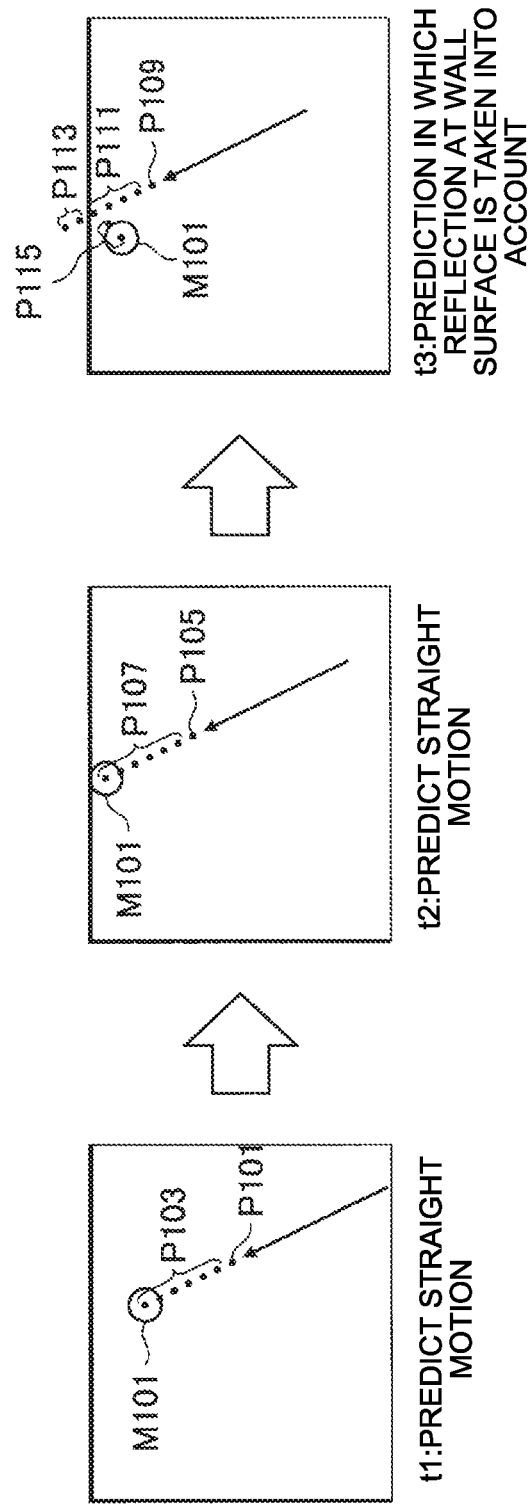
FIG. 5 is an explanatory diagram for explaining an example of the method of estimating movement of the target object by the information processing apparatus according to one embodiment.

For example, FIG. 5 is an explanatory diagram for explaining an example of the method of estimating movement of the target object by the information processing apparatus according to the present embodiment, and illustrates an example of the method of estimating movement of the target object while taking into account a surrounding environment of the target object. In the example illustrated in FIG. 5, an exemplary case is illustrated in which the puck M101 as the target object hits against an obstacle (for example, the wall surface of the stage M105 illustrated in FIG. 1) and movement of the puck M101 is changed.

For example, in a frame $t_1$, the puck M101 moves straight toward the wall surface. In the figure corresponding to the frame $t_1$, a reference symbol P101 denotes a latest detected position of the puck M101 (hereinafter, also referred to as a "detected point"). Further, a reference symbol P103 denotes predicted points that are calculated from a history of detected points.

Meanwhile, as illustrated in FIG. 5, a delay occurs from detection of the position of the puck M101 as the target object to estimation of movement (in other words, predicted points) of the puck M101, and if the puck M101 keeps moving, the position of the puck M101 is changed even during a delay period. Therefore, the calculated predicted points may include a point that substantially indicates a past position of the puck M101. Meanwhile, a timing (frame) at which the puck M101 is located at a position indicated by each of the predicted points may be estimated by, for example, a change of velocity or acceleration of the puck M101.

In other words, in the frame $t_1$, the estimation processing unit 109 estimates that the puck M101 is moving straight on the basis of the calculation result of the predicted points P103 based on the detection result of the detected point P101 and on the basis of the recognition result of the surrounding environment of the puck M101.

Subsequently, in the frame $t_2$, the puck M101 hits against the wall surface. In the figure corresponding to the frame $t_2$, a reference symbol P105 denotes a latest detected point. Further, a reference symbol P107 denotes predicted points that are calculated from a history of detected points. In this case, the estimation processing unit 109 estimates that the puck M101 moving straight hits against the wall surface, on the basis of the calculation result of the predicted points P107 based on the detection result of the detected point P105 and on the basis of the recognition result of the surrounding environment of the puck M101.

Subsequently, in the frame $t_3$, the puck M101 hits against the wall surface and a motion direction of the puck M101 is changed. In the figure corresponding to the frame $t_3$, a reference symbol P109 denotes a latest detected point. Further, reference symbols P111 and P113 denote predicted points that are calculated from a history of detected points. Meanwhile, the predicted points P113 among the predicted points P111 and P113 that are calculated based on the detected point P109 are located at substantially the same position as the wall surface against which the puck M101 hits or located behind the wall surface (i.e., overshoot). In this case, the estimation processing unit 109 may estimate a change of the motion direction of the puck M101 due to reflection of the puck M101 by the wall surface, on the basis of the recognition result of the surrounding environment of the puck M101, and correct the positions of the predicted points P113 that are located behind the wall surface in accordance with the estimation result. For example, a reference symbol P115 denotes a corrected predicted point. Meanwhile, it is possible to estimate a change of the moving direction of the puck M101 due to reflection by the wall surface, on the basis of, for example, a recognition result of the shape of the wall surface, a positional relationship between the wall surface and the puck M101, the motion direction of the puck M101, and the like.

Through the control as described above, the estimation processing unit 109 is able to accurately estimate (eventually predict) movement of the target object even in a circumstance in which the target object (for example, the puck M101) hits against the wall surface or other objects and the movement of the target object is changed.

Meanwhile, while the case has been described above in which the target object hits against an obstacle and the motion direction of the target object is changed, but an external factor that is estimated to affect motion of the target object is not limited to presence of an obstacle or the like as described above. As a specific example, a case in which an external force, such as air or a water stream, acts on the target object and the motion of the target object is changed, and a case in which the motion of the target object is changed due to a friction force that acts on the target object may occur. Further, if the target object is configured like a vehicle in such a manner that the target object is movable by interlinked operation of a plurality of parts, it may be possible to regard a friction force that acts between the parts as an external factor that is likely to affect motion of the target object. Even in these cases, if it is possible to detect the external factor, it is possible to estimate a change of movement of the target object by taking into account an impact of the external factor. Meanwhile, a method of estimating a change of the movement of the target object due to the impact of the external factor is not specifically limited. For example, it may be possible to estimate the movement of the target object by taking into account known information, such as a size or a weight of the target object, on the basis of a formula for laws of physics, such as a motion equation. Furthermore, it may be possible to use what is called machine learning to estimate the movement of the target object. In this case, it is possible to use information, such as movement of the target object before a change, an impact of the external factor, and movement of the target object after a change due to the external factor, for generating teaching data for the machine learning. Moreover, it is possible to appropriately use an estimation method corresponding to an external factor.

Then, the estimation processing unit 109 outputs information indicating an estimation result of the movement of the target object (for example, a calculation result of the predicted points for which the impact of the surrounding environment of the target object is taken into account) to the output control unit 111. Meanwhile, the estimation processing unit 109 corresponds to an example of an "estimation unit" that estimates movement of a target object.

The output control unit 111 causes the output unit 155 to output desired information to thereby present the information to a user. For example, as in the example illustrated in FIG. 1, if the output unit 155 is configured as a projector, the output control unit 111 causes the output unit 155 to project display information as a video, to thereby present the display information to a user.

Further, the output control unit 111 may acquire information indicating the estimation result of the movement of the target object from the estimation processing unit 109, and controls presentation of information via the output unit 155 in accordance with the estimation result. As a specific example, as in the example illustrated in FIG. 1, the output control unit 111 may control a position at which the display information is projected by the output unit 155 such that the display information is superimposed on the puck M101 that moves in a predetermined region (for example, in the stage M105). Meanwhile, as described above, a delay may occur from detection of the position of the target object (for example, the puck M101) (i.e., from identification of the detected point) to calculation of predicted points. Therefore, for example, the output control unit 111 may determine a predicted point corresponding to the position at which the display information is projected, while taking into account the delay. With this control, for example, it is possible to cause a projection position of the display information to follow the movement of the puck M101 such that the display information is superimposed on the puck M101 that moves around inside the stage M105. In other words, it is possible to control the projection position of the display information in synchronization with the movement of the puck M101.

Meanwhile, in the example as described above, information acquired from the estimation processing unit 109 indicates movement of the target object that is estimated based on the image captured by the imaging unit 151. Therefore, positions of the predicted points or the like are calculated based on the coordinate system associated with the imaging unit 151. In contrast, the installation positions of the imaging unit 151 and the output unit 155 do not always coincide with each other. Therefore, the coordinate system associated with the imaging unit 151 and the coordinate system associated with the output unit 155 may deviate from each other in accordance with a relative positional relationship between the imaging unit 151 and the output unit 155. In view of the circumstance as described above, the output control unit 111 may transform the estimation result of the position of the target object based on the information acquired from the estimation processing unit 109 into a position in the coordinate system of the output unit 155, and thereafter control a position at which the display information is projected in accordance with the position of the target object in the coordinate system.

Figure 6:
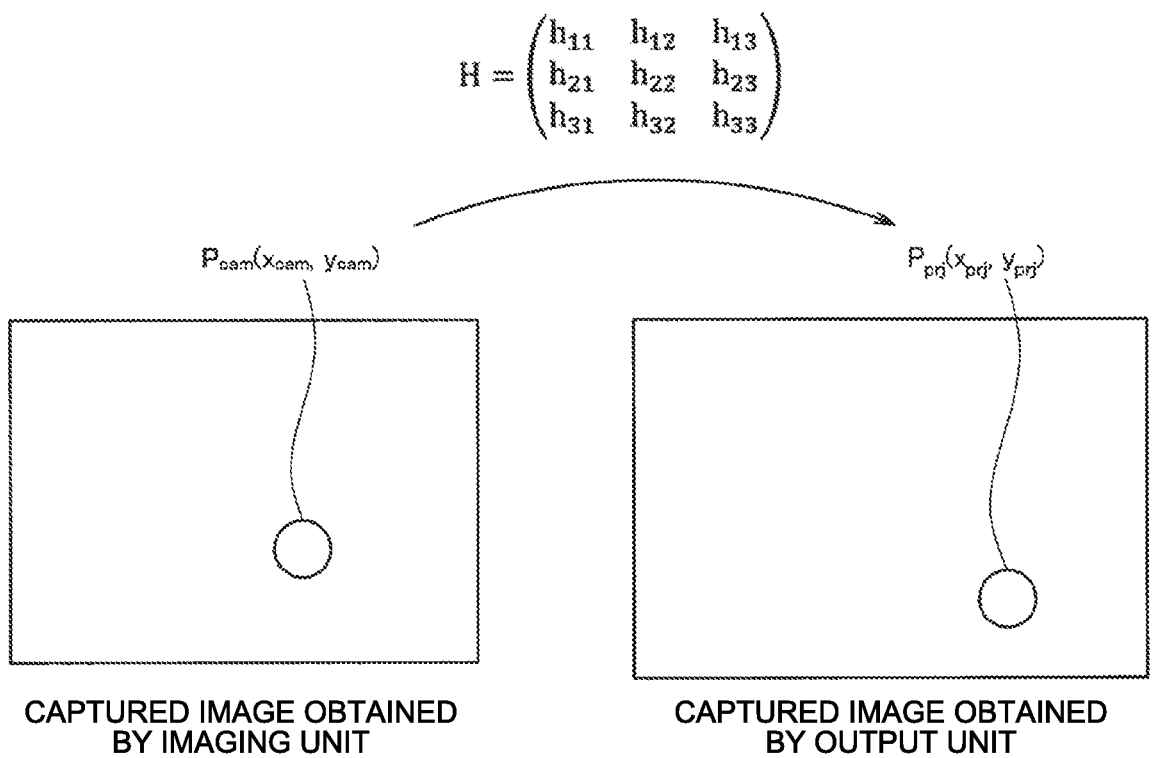
FIG. 6 is an explanatory diagram for explaining an overview of a coordinate transformation between an imaging unit and an output unit.

For example, FIG. 6 is an explanatory diagram for explaining an overview of coordinate transformation between the imaging unit 151 and the output unit 155. As illustrated in FIG. 6, it is assumed that a position in the captured image captured by the imaging unit 151 (i.e., a position in the coordinate system of the imaging unit 151) is denoted by $P_{cam}(x_{cam}, y_{cam})$, and a position in a projected image projected by the output unit 155 (i.e., a position in the coordinate system of the output unit 155) is denoted by $P_{prj}(x_{prj}, y_{prj})$. In this case, it is possible to transform the position $P_{cam}(x_{cam}, y_{cam})$ in the captured image into the position $P_{prj}(x_{prj}, y_{prj})$ in the projected image on the basis of a transformation formula using a projective transformation matrix H between the imaging unit 151 and the output unit 155, which is represented by (Expression 3) below. Meanwhile, the projective transformation matrix H is calculated in accordance with the relative positional relationship between the imaging unit 151 and the output unit 155, and represented by (Expression 4) below, for example.

$$\begin{pmatrix} x_{prj} \\ y_{prj} \\ 1 \end{pmatrix} = H \begin{pmatrix} x_{cam} \\ y_{cam} \\ 1 \end{pmatrix} \quad (3)$$

$$H = \begin{pmatrix} h_{11} & h_{12} & h_{13} \\ h_{21} & h_{22} & h_{23} \\ h_{31} & h_{32} & h_{33} \end{pmatrix} \quad (4)$$

Figure 7:
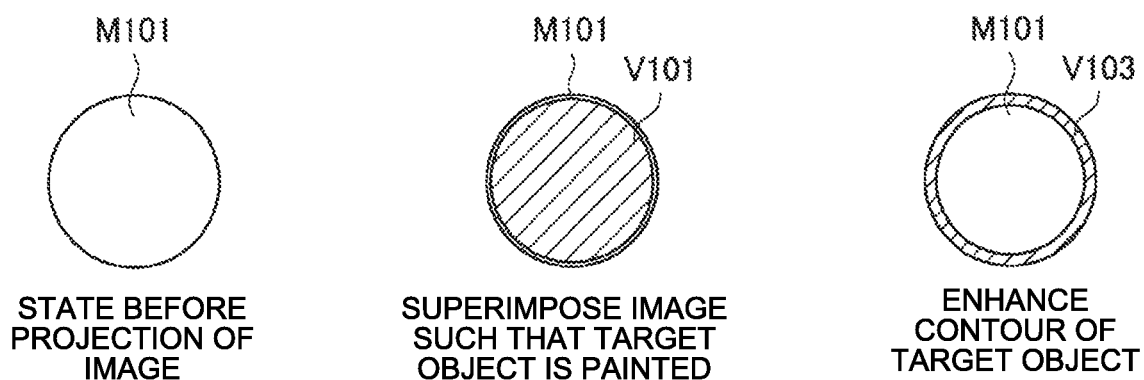
FIG. 7 is an explanatory diagram for explaining examples of display information that is presented in a superimposed manner on the target object.

In addition, FIG. 7 is an explanatory diagram for explaining examples of the display information that is presented in a superimposed manner on the target object, and illustrates an example of visual expression by projection of the display information in a case where the puck M101 illustrated in FIG. 1 is adopted as the target object. A left figure in FIG. 7 indicates a state of the puck M101 before a video is projected. In contrast, a middle figure in FIG. 7 indicates an example in which a video V101 is superimposed on the puck M101 such that at least a part of a surface (top surface) (for example, the entire surface) of the puck M101 is painted. Further, a right figure in FIG. 7 indicates an example in which a ring-shaped video V103 is superimposed on the puck M101 such that a contour of the puck M101 is enhanced. The above-described examples are of course mere examples, and information that is presented in accordance with the estimation result of the movement of the target object in the information processing system 1 according to the present embodiment is not limited to the examples illustrated in FIG. 7.

Furthermore, the output control unit 111 may control a display mode of the display information that is presented by the output unit 155 in accordance with the estimation result of the movement of the target object. As a specific example, if it is estimated (predicted) that the movement of the target object may be changed because the target object hits against a different object (for example, an obstacle), the output control unit 111 may control a display mode (for example, at least any of a size, a color, and a shape) of the display information in synchronization with the timing of the change of the movement. Meanwhile, an example of control of the display mode will be described in detail later.

Meanwhile, the output control unit 111 corresponds to an example of a "control unit" that causes the display information to be presented in a display mode corresponding to the estimation result of the movement of the target object. Further, a part of the output control unit 111 that acquires the information on the estimation result of the movement of the target object from the estimation processing unit 109 corresponds to an example of an "acquisition unit".

Furthermore, the functional configuration as described above is a mere example, and does not limit the functional configuration of the information processing system 1 according to the present embodiment. As a specific example, at least two or more components among the information processing apparatus 100, the imaging unit 151, the projector unit 153, and the output unit 155 may be configured in an integrated manner. Moreover, a part of the components of the information processing apparatus 100 may be arranged outside of the information processing apparatus 100. As a specific example, it may be possible to use, as the storage unit 105, a storage device that is externally attached to the information processing apparatus 100 or a storage device that is connected to the information processing apparatus 100 via a network. Furthermore, each of the functions of the information processing apparatus 100 may be implemented by a plurality of devices that operate in cooperation with one another.

Thus, one example of the functional configuration of the information processing system according to one embodiment of the present disclosure has been described above with reference to FIG. 2 to FIG. 7 with particular focus on the functional configuration of the information processing apparatus 100.

3. PROCESSES

An example of the flow of a series of processes performed by the information processing system according to one embodiment of the present disclosure will be described below with particular focus on processes performed by the information processing apparatus 100. For example, FIG. 8 is a flowchart illustrating an example of the flow of a series of processes performed by the information processing system according to one embodiment of the present disclosure.

Figure 8:
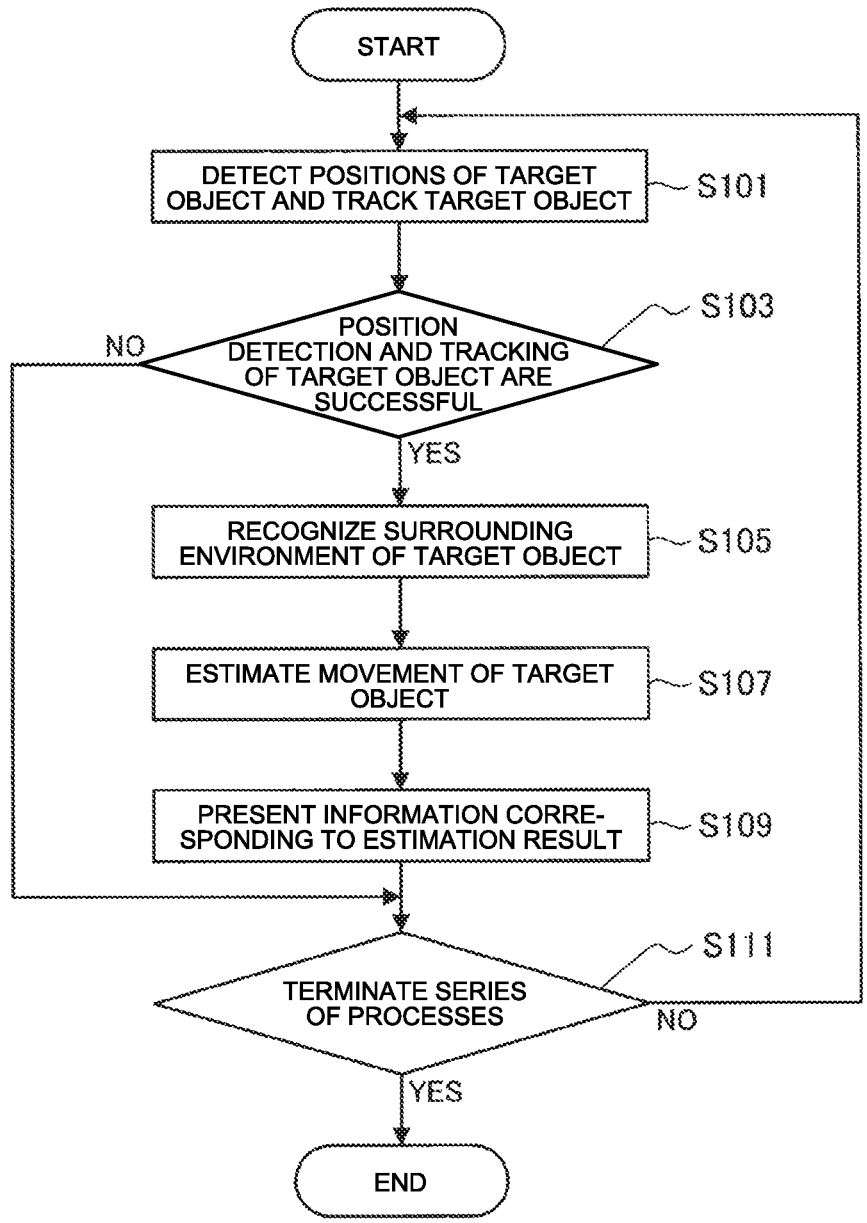
FIG. 8 is a flowchart illustrating an example of the flow of a series of processes performed by the information processing system according to one embodiment.

As illustrated in FIG. 8, the information processing apparatus 100 (the target object detection unit 107) detects a position of a target object in a predetermined region, on the basis of an image in which the region is captured by the imaging unit 151, or the like. In this case, the information processing apparatus 100 may sequentially detect positions of the target object on the basis of the images that are sequentially captured for respective predetermined frames, and store detection results of the positions of the target object for the respective frames in a chronological order as a history. With this control, the information processing apparatus 100 attempts to track the target object that moves in the predetermined region (S101).

If position detection and tracking of the target object are successful (S103, YES), the information processing apparatus 100 (the environmental information generation unit 103) recognizes a surrounding environment of the target object on the basis of the image in which the predetermined region is captured by the imaging unit 151 or the like (S105).

Subsequently, the information processing apparatus 100 (the estimation processing unit 109) estimates movement of the target object in and after the latest frame in which the position has been detected, on the basis of a result of the position detection and the tracking of the target object. In other words, the information processing apparatus 100 calculates predicted points. Further, in this case, the information processing apparatus 100 may estimate the movement of the target object while taking into account a recognition result of a surrounding environment of the target object. As a specific example, the information processing apparatus 100 may correct at least some predicted points among the calculated predicted points in accordance with the recognition result of the surrounding environment of the target object (S107).

Then, the information processing apparatus 100 (the output control unit 111) controls presentation of information via a predetermined output unit in accordance with an estimation result of the movement of the target object. As a specific example, the information processing apparatus 100 may control a presentation position of display information such that the display information is presented at a position corresponding to the estimation result of the movement of the target object (for example, the position of the target object). Accordingly, for example, it is possible to cause a video to be projected with respect to a moving target object. Furthermore, the information processing apparatus 100 may control a display mode of the display information in accordance with the estimation result of the movement of the target object. As a specific example, if it is estimated (predicted) that the target object hits against a different object or the like and the movement of the target object is to be changed, the information processing apparatus 100 may control the display mode of the display information in synchronization with a timing at which the movement of the target object is changed. Accordingly, for example, it is possible to present a video that represents the hit in a produced manner, in synchronization with a timing at which the target object hits against an obstacle.

Meanwhile, if the position detection and the tracking of the target object are not successful (S103, NO), the information processing apparatus 100 need not perform the processes denoted by the reference symbols S105 to S109. As described above, unless termination of the series of processes is designated (S111, NO), the information processing apparatus 100 sequentially performs the series of processes denoted by the reference symbols S101 to S109. Then, if termination of the series of processes is designated (S111, YES), the information processing apparatus 100 terminates execution of the series of processes denoted by the reference symbols S101 to S109.

Thus, one example of the flow of the series of processes performed by the information processing system according to one embodiment of the present disclosure has been described above with reference to FIG. 8, with particular focus on the processes performed by the information processing apparatus 100.

4. MODIFICATIONS

Modifications of the information processing system according to one embodiment of the present disclosure will be described below.

4.1. First Modification: Another Example of Method of Estimating Movement of Target Object First, as a first modification, as an example of the method of estimating movement of a target object, another example that is different from the example which has been described above with reference to FIG. 5 and in which an estimation result of a predicted point is corrected in accordance with an environment will be described. Meanwhile, in the following explanation, the method of estimating movement of a target object described above with reference to FIG. 5 may also be referred to as a "first estimation method", and the method of estimating movement of a target object according to the present modification may also be referred to as a "second estimation method". Further, processes related to the first estimation method correspond to one example of a "first process", and processes related to the second estimation method correspond to one example of a "second process".

In the first estimation method, movement of a target object is estimated based on general laws of physics while taking into account a recognition result of a surrounding environment of the target object. Therefore, in the first estimation method, it is also possible to predict future movement of the target object while taking into account a delay due to calculation of predicted points. However, in a circumstance in which a plurality of external factors that are estimated to affect motion of the target object are present, processes for predicting movement of the target object while taking into account the external factors may become complex, and a circumstance in which accuracy of the prediction is eventually reduced may occur.

Figure 9:
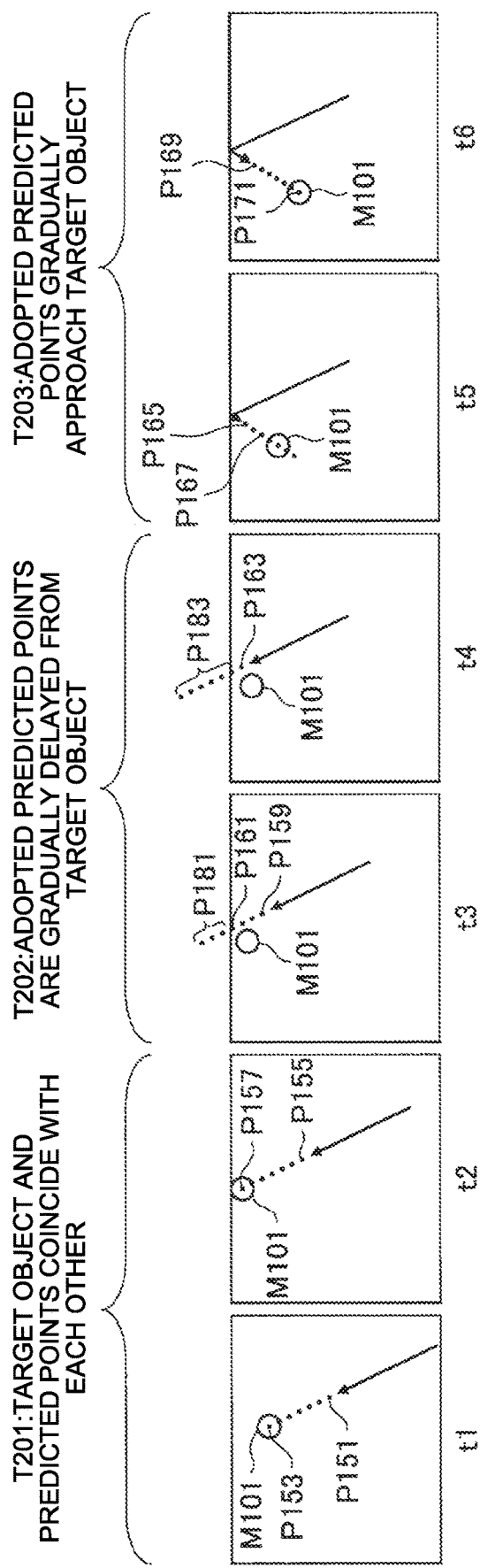
FIG. 9 is an explanatory diagram for explaining an overview of an example of a method of estimating movement of a target object according to a first modification.

In contrast, in the second estimation method, a capability to follow movement of the target object is more focused on as compared to the first estimation method. For example, FIG. 9 is an explanatory diagram for explaining an overview of an example of the method of estimating movement of a target object according to the first modification. In the example illustrated in FIG. 9, similarly to the example described above with reference to FIG. 5, an exemplary case is illustrated in which the puck M101 as the target object hits against the wall surface as an obstacle and movement of the puck M101 is changed.

For example, in a frame $t_1$, the puck M101 moves straight toward the wall surface. In the figure corresponding to the frame $t_1$, a reference symbol P151 denotes a latest detected point. Further, a reference symbol P153 denotes a predicted point that is used (i.e., a predicted point that is adopted) for presentation of information (for example, projection of a video) in the frame $t_1$ among predicted points that are calculated from a history of detected points. Furthermore, in a frame $t_2$, the puck M101 hits against the wall surface. In the figure corresponding to the frame $t_2$, a reference symbol P155 denotes a latest detected point. Moreover, a reference symbol P157 denotes a predicted point that is adopted in the frame $t_2$ among predicted points that are calculated form a history of detected points. During a period T201 from the frame $t_1$ to the frame $t_2$, the puck M101 moves straight and all of the calculated predicted points are not located outside of the wall surface. Therefore, the information processing apparatus 100 adopts predicted points (i.e., the predicted points P153 and P157) corresponding to the positions of the puck M101 among the calculated predicted points.

In contrast, in a frame $t_3$, a position of a latest detected point P159 is located closer to the wall surface as compared to the frame $t_2$. That is, in the frame $t_3$, some predicted points (for example, predicted points denoted by a reference symbol P181) among predicated points that are calculated from a history of detected points overlap with the position of the wall surface or are located behind the wall surface (i.e., overshoot). In this case, the information processing apparatus 100 adopts, as the predicted point used for presentation of information, a predicted point that is located on a front side of the wall surface (i.e., a predicted point at which a prediction amount is smaller than a prediction amount at an overshot predicted point) among the calculated predicted points. For example, in the example illustrated in FIG. 9, in the frame $t_3$, a latest predicted point P161 (i.e., a predicted point at which a prediction amount is large) among the predicted points that are located on the front side of the wall surface is adopted. Further, in a frame $t_4$, a position of a latest detected point P163 is located closer to the wall surface, and all of predicted points (i.e., predicted points denoted by a reference symbol P183) calculated from a history of detected points overlap with the position of the wall surface or are located behind the wall surface (i.e., overshoot). In this case, the information processing apparatus 100 adopts the latest detected point P163 as the predicted point used for presentation of information. That is, during a period T202 from the frame $t_3$ to the frame $t_4$, the information processing apparatus 100 limits a chronological range used for estimation of movement of the target object (hereinafter, also referred to as an "estimation range"), to thereby prevent prediction that the puck M101 is located behind the wall surface from being adopted.

Meanwhile, during the period T202, movement of the puck M101 is already changed due to the hit against the wall surface, but the latest detected points (i.e., the detected points P159 and P163) correspond to the state before the puck M101 hits against the wall surface. During the period T202, the puck M101 as the target object continues to move straight in a reflected direction after hitting against the wall surface, whereas the positions of the adopted predicted points are maintained at the same position as the position adopted just before the puck M101 hits against the wall surface. That is, the adopted predicted points are gradually delayed from the puck M101.

Next, frames $t_5$ and $t_6$ are focused on. In the frame $t_5$, a position of the puck M101 after reflection by the wall surface is detected as a latest detected point P165. Further, in the frame $t_6$, a position of a latest detected point P169 is further separated from the wall surface so as to follow the movement of the puck M101. In this manner, after the position of the target object (for example, the puck M101) whose movement has been changed due to an external factor, such as the wall surface, is detected as the latest detected point, the information processing apparatus 100 returns the limited estimation range to a non-limited state, to thereby eliminate the delay between the predicted point and the target object. For example, in the figure corresponding to the frame $t_5$, a reference symbol P167 denotes a predicted point that is used for presentation of information (i.e., a predicted point that is adopted) in the frame $t_5$ among predicted points that are calculated from a history of detected points. Further, in the figure corresponding to the frame $t_6$, a reference symbol P171 denotes a predicted point that is adopted in the frame $t_6$. That is, during a period T203 from the frame $t_5$ to the frame $t_6$, the information processing apparatus 100 determines a predicted point that is used (i.e., a predicted point that is adopted) for presentation of information in such a manner that a prediction amount gradually increases in a way that is counter to the period T202, to thereby eliminate the above-described delay. For example, in the example illustrated in FIG. 9, in the frame $t_6$, the position of the puck M101 and the position of the adopted predicted point P171 substantially coincide with each other, which indicates that a delay between the adopted predicted point P171 and the puck M101 is eliminated.

Thus, one example of the overview of the method of estimating movement of a target object (i.e., the second estimation method) according to the first modification has been described above with reference to FIG. 9.

An example of the flow of a series of processes performed by an information processing system according to the first modification will be described below with reference to FIG. 10 and FIG. 11, with particular focus on processes performed by the information processing apparatus 100. For example, FIG. 10 and FIG. 11 are flowcharts illustrating an example of the flow of the series of processes performed by the information processing system according to the first modification.

First, the flow of the series of processes performed by the information processing apparatus 100 will be described with reference to FIG. 10. Meanwhile, in FIG. 10, processes denoted by reference symbols S201 to S205 and S209 to S211 are substantially the same as the processes described above with reference to FIG. 8, and therefore, detailed explanation of these processes will be omitted.

Figure 10:
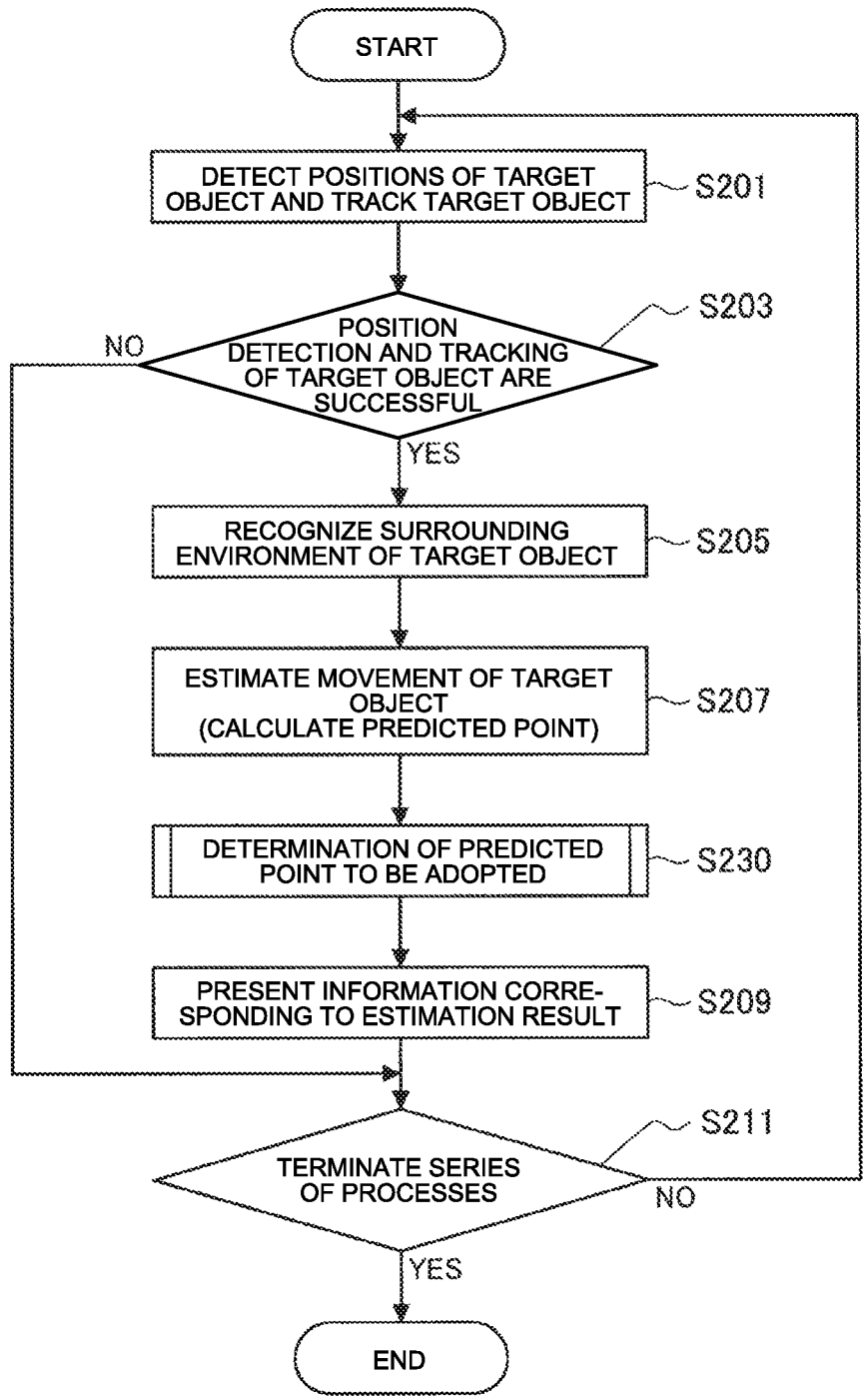
FIG. 10 is a flowchart illustrating an example of the flow of a series of processes performed by an information processing system according to a first modification.
Figure 11:
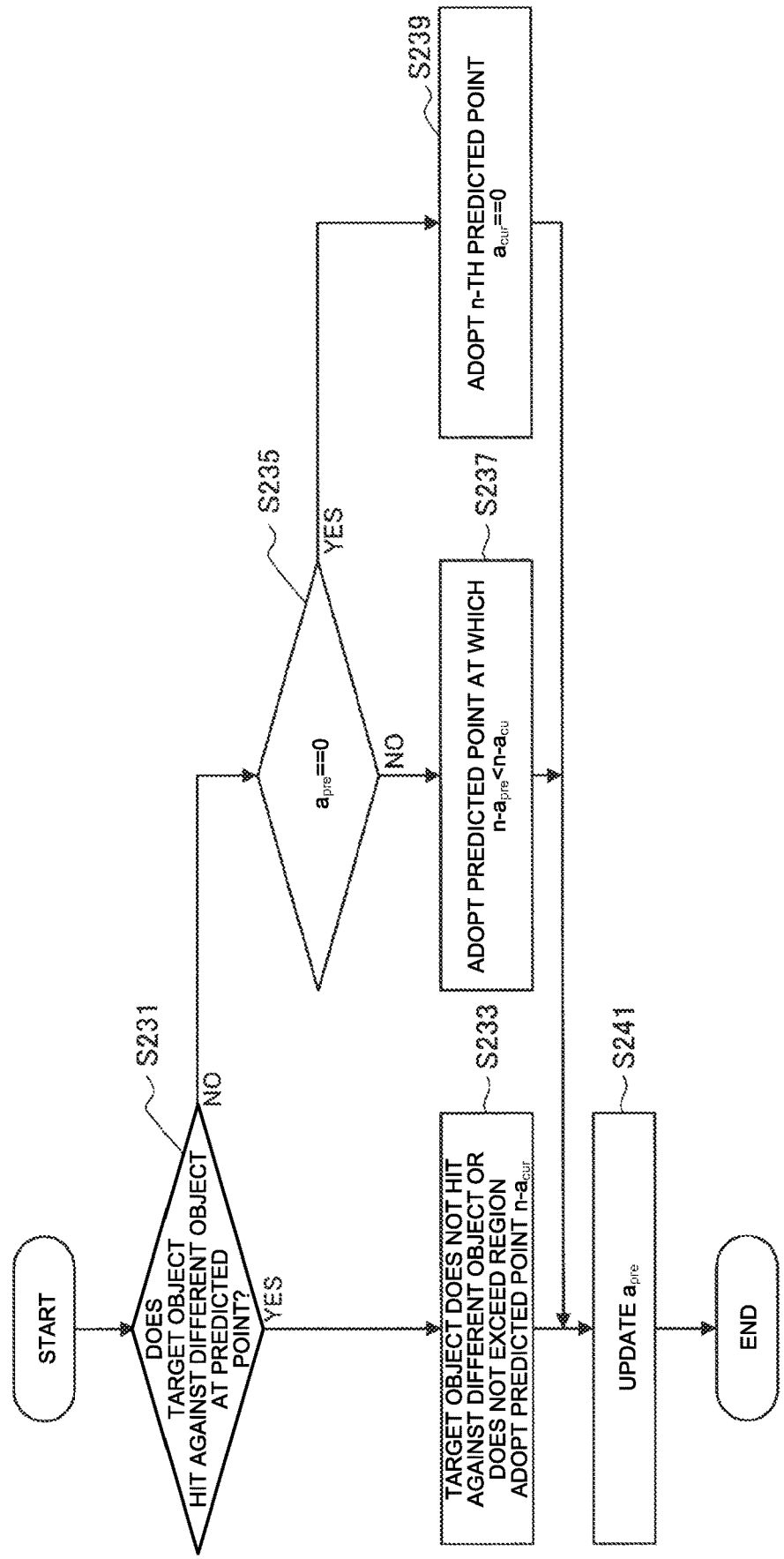
FIG. 11 is a flowchart illustrating an example of the flow of a series of processes performed by the information processing system according to the first modification.

As illustrated in FIG. 10, the information processing apparatus 100 (the target object detection unit 107) attempts to detect a position of a target object and track the target object in a predetermined region on the basis of an image in which the predetermined region is captured by the imaging unit 151 or the like (S201). If position detection and tracking of the target object are successful (S203, YES), the information processing apparatus 100 (the environmental information generation unit 103) recognizes a surrounding environment of the target object on the basis of the image in which the predetermined region is captured by the imaging unit 151 or the like (S205).

Subsequently, the information processing apparatus 100 (the estimation processing unit 109) estimates movement of the target object in and after a latest frame in which the position has been detected, on the basis of a result of the position detection and the tracking of the target object. In other words, the information processing apparatus 100 calculates predicted points (S207).

Subsequently, the information processing apparatus 100 (the estimation processing unit 109) determines a predicted point that is used (i.e., a predicted point that is adopted) for presentation of information among the calculated predicted points (S230). Meanwhile, this process will be described in detail later.

Then, the information processing apparatus 100 (the output control unit 111) controls presentation of the information via a predetermined output unit in accordance with an estimation result of the movement of the target object (S209).

Meanwhile, if the position detection and the tracking of the target object are not successful (S203, NO), the information processing apparatus 100 need not perform the processes denoted by the reference symbols S205, S207, S230, and S209. As described above, unless termination of the series of processes is designated (S211, NO), the information processing apparatus 100 sequentially performs the series of processes denoted by the reference symbols S201 to S207, S230, and S209. Then, if termination of the series of processes is designated (S111, YES), the information processing apparatus 100 terminates execution of the series of processes denoted by the reference symbols S201 to S207, S230, and S209.

Thus, the flow of the series of processes performed by the information processing apparatus 100 has been described above with reference to FIG. 10.

Next, an example of a process that is indicated by the reference symbol S230 in FIG. 10 and that is performed by the information processing apparatus 100 to determine a predicted point that is used (i.e., a predicted point that is adopted) for presentation of information among the calculated predicted points will be described with reference to FIG. 11.

Meanwhile, in the following explanation, for the sake of convenience, it is assumed that the number of predicted points to be calculated is n, and the predicted points are referred to as a predicted point 1, a predicted point 2, ..., and a predicted point n in order from the predicted point located closest to a detected point along a direction in which a prediction amount increases. Further, it is assumed that the predicted point n is a predicted point that substantially coincides with the position of the target object (i.e., a predicted point that is not delayed from the target object). Furthermore, a coefficient $a_{cur}$ corresponds to a coefficient for indicating a predicted point that is adopted in a current frame. Specifically, a predicted point n-$a_{cur}$ ($0<a_{cur}<n$) corresponds to the predicted point that is adopted in the current frame. Moreover, a coefficient $a_{pre}$ corresponds to a coefficient for indicating a predicted point that is adopted in a preceding frame (a frame immediately prior to the current frame). Specifically, a predicted point n-$a_{pre}$ ($0<a_{pre}<n$) corresponds to the predicted point that is adopted in the preceding frame.

As illustrated in FIG. 11, the information processing apparatus 100 (the estimation processing unit 109) calculates one or more predicted points on the basis of the result of the position detection and the tracking of the target object (in other words, a history of detected points), and determines whether the target object hits against a different object at at least one of the predicted points (S231).

If a hit against the different object occurs at a predicted point (S231, YES), the information processing apparatus 100 (the estimation processing unit 109) adopts, as the predicted point n-$a_{cur}$ of the current frame, a predicted point that does not overlap with the different object or a predicted point that does not exceed a region shielded by the object (i.e., overshoot does not occur) (S233). Then, the information processing apparatus 100 updates the coefficient $a_{pre}$ in accordance with a result of the predicted point n-$a_{cur}$ adopted in the current frame. As a specific example, the information processing apparatus 100 updates the coefficient $a_{pre}$ with the coefficient $a_{cur}$ in accordance with a result of the adopted predicted point n-$a_{cur}$ (S241). With this control, for example, a predicted point at which a prediction amount is smaller is adopted with a decrease in a distance to the different object from a detected point that is detected in the state before the target object hits against the different object.

In contrast, if a hit against the different object does not occur at a predicted point (S231, YES), the information processing apparatus 100 (the estimation processing unit 109) determines the predicted point n-$a_{cur}$ of the current frame in accordance with a value of the coefficient $a_{pre}$ of the current frame.

Specifically, if the coefficient $a_{pre}$ is not zero (S235, NO), the information processing apparatus 100 (the estimation processing unit 109) determines the predicted point n-$a_{cur}$ that is adopted in the current frame, in such a manner that a condition, such as n-$a_{pre}$<n-$a_{cur}$, is met (S237). Then, the information processing apparatus 100 updates the coefficient $a_{pre}$ in accordance with the result of the predicted point n-$a_{cur}$ adopted in the current frame (S241). With this control, for example, a predicted point at which a prediction amount is larger is adopted with an increase in the distance from the different object to a detected point that is detected in the state after the target object hits against the different object. That is, a delay that has occurred between the actual position of the target object and the predicted point that is adopted (i.e., the predicted point n-$a_{cur}$ of the current frame) is gradually eliminated.

Furthermore, if the coefficient $a_{pre}$ is zero (S235, YES), the information processing apparatus 100 (the estimation processing unit 109) determines the predicted point n-$a_{cur}$ that is adopted in the current frame, in such a manner that the condition, such as $a_{cur}$=0, is met. That is, the information processing apparatus 100 adopts the predicted point n (S241). Then, the information processing apparatus 100 updates the coefficient $a_{pre}$ in accordance with the result of the predicted point n-$a_{cur}$ adopted in the current frame (S241). Meanwhile, in this case, the position of the target object and the position of the predicted point n-$a_{cur}$ of the current frame substantially coincide with each other (i.e., the predicted point n-$a_{cur}$ is superimposed on the target object).

Thus, one example of the process that is denoted by the reference symbol S230 in FIG. 10 and that is performed by the information processing apparatus 100 to determine a predicted point that is used (i.e., a predicted point that is adopted) for presentation of information among the calculated predicted points has been described above with reference to FIG. 11. Meanwhile, the above-described example has been explained with focus mainly on the case in which the target object hits against an obstacle; however, similarly to the embodiment as described above, an external factor that is estimated to affect motion of the target object is not limited to presence of an obstacle or the like as described above. That is, a case in which an external force, such as air or a water stream, acts on the target object and the motion of the target object is changed, and a case in which the motion of the target object is changed due to a friction force that acts on the target object may occur. Even in these cases, it may be possible to determine a predicted point that is adopted in accordance with an estimation result of a change of the movement of the target object while taking into account an impact of the above-described external factor.

As described above, in the second estimation method, in some cases, a delay may occur between an adopted predicted point and a target object at a timing at which movement of the target object is changed, such as a timing at which the target object hits against a different object. Meanwhile, in the second estimation method, prediction of the movement of the target object with the surrounding environment taken into account as in the first estimation method (for example, prediction of the movement of the target object after reflection by an obstacle) is limited. Therefore, even in a circumstance in which it is difficult to predict a change of the movement of the target object due to impacts of a plurality of external factors, it is possible to prevent occurrence of a situation in which incorrect prediction is adopted, and it is possible to cause the adopted predicted point to follow the movement of the target object with accuracy.

4.2. Second Modification: Example of Visual Expression

As a second modification, an example of a mode for presenting information in accordance with an estimation result of movement of a target object (i.e., an example of visual expression) will be described. As described above, if it is predicted that movement of a target object is to be changed, the information processing apparatus 100 according to the present embodiment is able to control a display mode of display information to be presented, in synchronization with a timing at which the movement of the target object is changed.

(First Example of Visual Expression: Expression Of Bounce at the Time of Hit)

Figure 12:
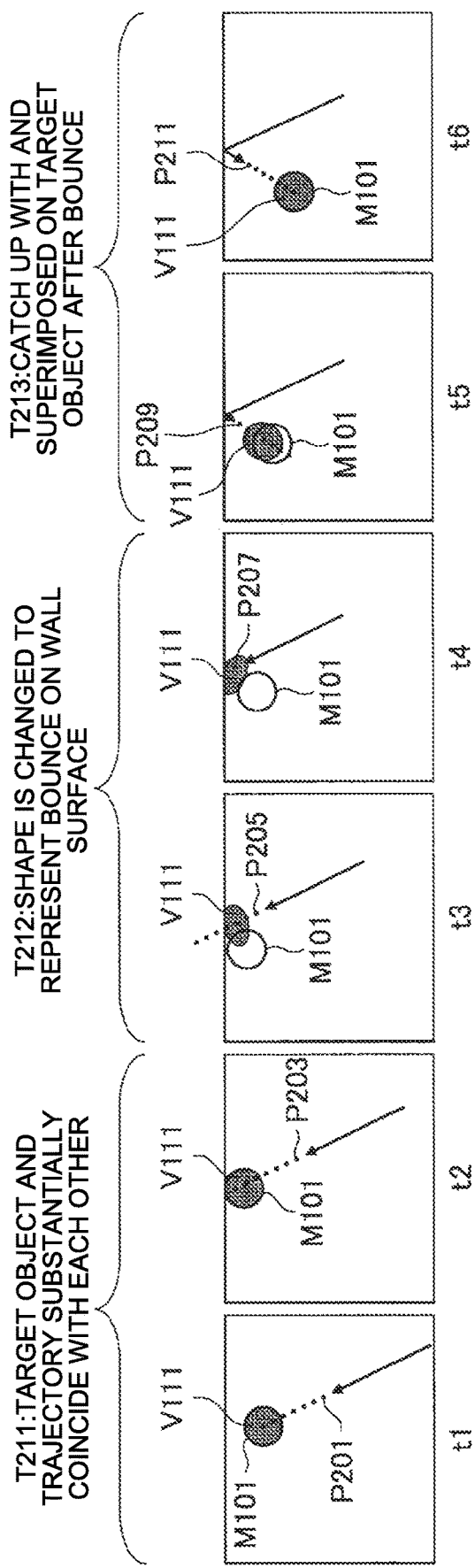
FIG. 12 is an explanatory diagram for explaining an example of a presentation mode of information that is presented by an information processing apparatus according to a second modification in accordance with an estimation result of movement of a target object.

For example, FIG. 12 is an explanatory diagram for explaining an example of a presentation mode of information that is presented by the information processing apparatus 100 according to the second modification in accordance with an estimation result of movement of a target object. In the example illustrated in FIG. 12, a situation is illustrated in which the puck M101 as the target object hits against and reflected by a wall surface (for example, the wall surface of the stage M105 in FIG. 1) during a period from a frame $t_1$ to a frame $t_6$. In FIG. 12, reference symbols P201, P203, P205, P207, P209, and P211 denote detected points in the respective frames $t_1$, $t_2$, $t_3$, $t_4$, $t_5$, and $t_6$.

Specifically, during a period T211 from the frame $t_1$ to the frame $t_2$, the puck M101 moves straight toward the wall surface. In this case, display information V111 is presented such that the display information V111 is superimposed on the target object M101. That is, during the period T211, a trajectory of the moving puck M101 (target object) and a trajectory of the display information V111 that is presented in a superimposed manner on the puck M101 substantially coincide with each other.

Subsequently, during a period T212 from the frame $t_3$ to the frame $t_4$, the puck M101 is reflected by the wall surface and movement of the puck M101 is changed. In this case, the information processing apparatus 100 predicts that the puck M101 hits against the wall surface in accordance with calculation results of predicted points based on the detected points (for example, the detected points P205 and P207). Then, in the example illustrated in FIG. 12, the information processing apparatus 100 changes a shape of the display information V111 as if the display information V111 bounces on the wall surface, in synchronization with a timing at which the puck M101 hits against the wall surface on the basis of a result of the prediction. With this control, it is possible to produce an expression as if the display information V111 bounces on the wall surface due to a hit against the wall surface.

Further, a period T213 from the frame $t_5$ to the frame $t_6$ indicates a state after the puck M101 is reflected by the wall surface. Meanwhile, in the frame $t_5$, the presentation position of the display information V111 is delayed from the puck M101 due to presentation of visual expression in which the bounce is produced. Even in this case, by performing control such that a predicted point at which a prediction amount is larger is gradually adopted, the information processing apparatus 100 is able to present the display information V111 such that the display information V111 catches up with the puck M101 and is superimposed on the puck M101 again.

(Second Example of Visual Expression: Expression of Orbit in a Case Where Repulsive Force Acts at the Time of Hit)

Figure 13:
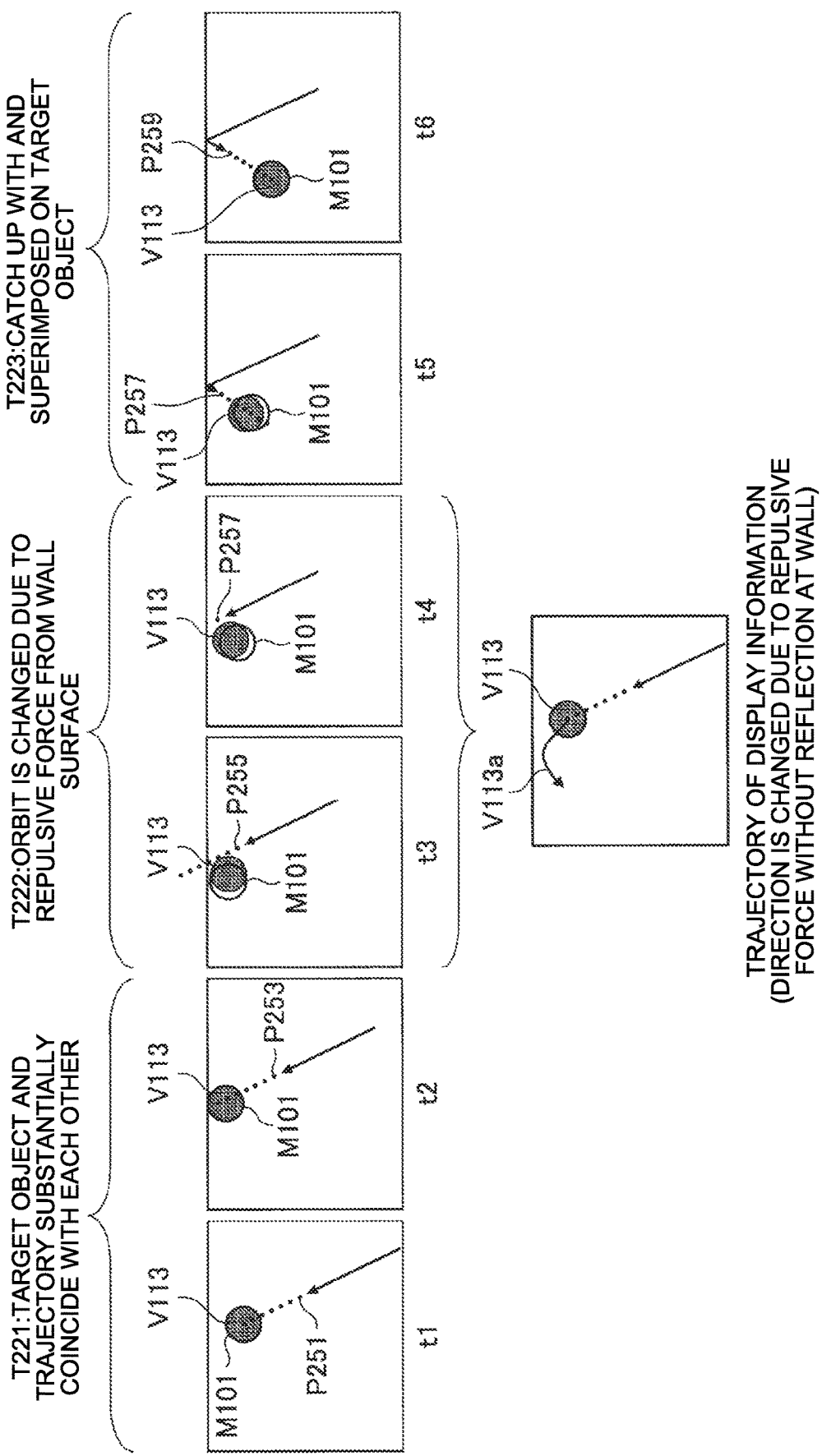
FIG. 13 is an explanatory diagram for explaining another example of the presentation mode of the information that is presented by the information processing apparatus according to the second modification in accordance with the estimation result of the movement of the target object.

FIG. 13 is an explanatory diagram for explaining another example of the presentation mode of the information that is presented by the information processing apparatus 100 according to the second modification in accordance with the estimation result of the movement of the target object. In the example illustrated in FIG. 13, similarly to the example illustrated in FIG. 12, a situation is illustrated in which the puck M101 as the target object hits against and reflected by the wall surface during a period from a frame $t_1$ to a frame $t_6$. In FIG. 13, reference symbols P251, P253, P255, P257, P259, and P261 denote detected points in the respective frames $t_1$, $t_2$, $t_3$, $t_4$, $t_5$, and $t_6$.

Specifically, during a period T221 from the frame $t_1$ to the frame $t_2$, the puck M101 moves straight toward the wall surface. In this case, display information V113 is presented such that the display information V113 is superimposed on the target object M101. That is, during the period T221, a trajectory of the moving puck M101 (the target object) and a trajectory of the display information V113 that is presented in a superimposed manner on the puck M101 substantially coincide with each other.

Subsequently, during a period T222 from the frame $t_3$ to the frame $t_4$, the puck M101 is reflected by the wall surface and movement of the puck M101 is changed. In this case, the information processing apparatus 100 predicts that the puck M101 hits against the wall surface in accordance with calculation results of predicted points based on the detected points (for example, the detected points P255 and P257). Then, in the example illustrated in FIG. 13, the information processing apparatus 100 controls an orbit of the display information V111 (i.e., a presentation position of the display information V113) such that the display information V113 does not hit against the wall surface, in synchronization with the timing at which the puck M101 hits against the wall surface on the basis of a result of the prediction. For example, a reference symbol V113a illustrated in a lower figure in FIG. 13 denotes an exemplary orbit of the display information V113 during the period T222. With this control, it is possible to produce an expression as if the orbit of the display information V113 is changed due to a repulsive force from the wall surface.

Further, a period T223 from the frame $t_5$ to the frame $t_6$ indicates a state after the puck M101 is reflected by the wall surface. Meanwhile, in the frame $t_5$, the presentation position is delayed from the puck M101 due to presentation of visual expression in which a change of the orbit due to the repulsive force is produced. Even in this case, by performing control such that the presentation position of the display information V113 gradually approaches the predicted point, the information processing apparatus 100 is able to present the display information V113 such that the display information V113 catches up with the puck M101 and is superimposed on the puck M101 again.

(Third Example of Visual Expression: Expression in which Effect Size is Changed at the Time of Hit)

Figure 14:
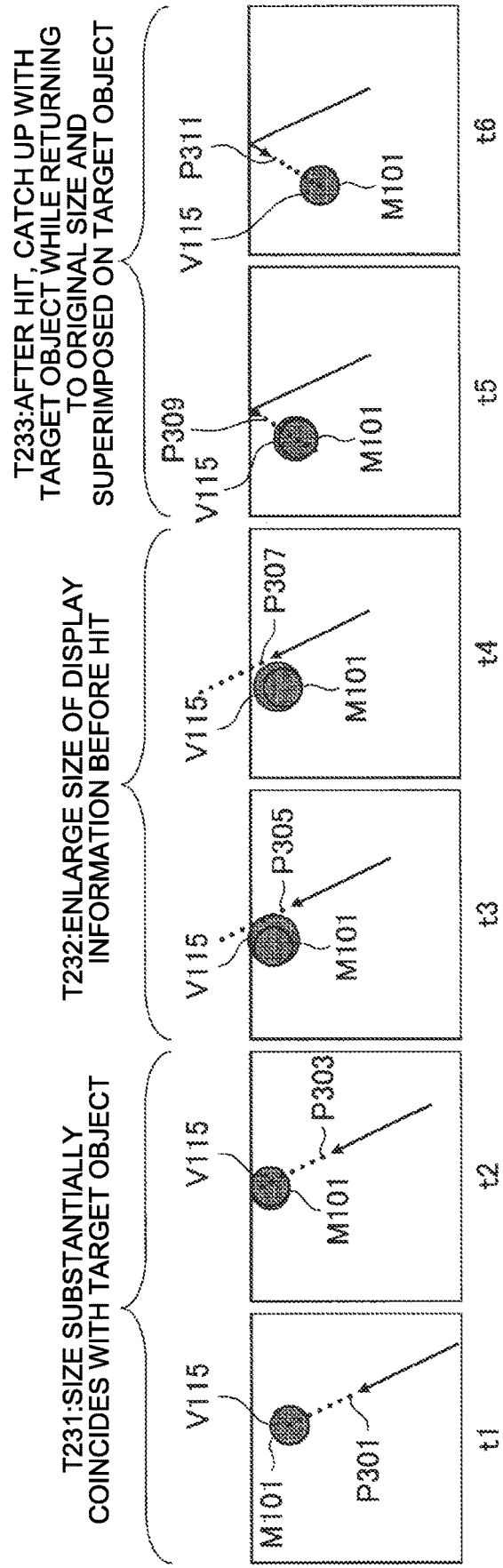
FIG. 14 is an explanatory diagram for explaining still another example of the presentation mode of the information that is presented by the information processing apparatus according to the second modification in accordance with the estimation result of the movement of the target object.

FIG. 14 is an explanatory diagram for explaining another example of the presentation mode of the information that is presented by the information processing apparatus 100 according to the second modification in accordance with the estimation result of the movement of the target object. In the example illustrated in FIG. 14, similarly to the example illustrated in FIG. 12, a situation is illustrated in which the puck M101 as the target object hits against and reflected by the wall surface during a period from a frame $t_1$ to to frame $t_6$. In FIG. 14, reference symbols P301, P303, P305, P307, P309, and P301 denote detected points in the respective frames $t_1$, $t_2$, $t_3$, $t_4$, $t_5$, and $t_6$.

In the example illustrated in FIG. 14, the information processing apparatus 100 presents display information V115 in a superimposed manner on the moving puck M101 (target object), and if the puck M101 hits against the wall surface or the like, the information processing apparatus 100 controls a size of the display information V115.

Specifically, during a period T231 from the frame $t_1$ to the frame $t_2$, the puck M101 moves straight toward the wall surface In this case, the size of the display information V115 is controlled so as to substantially coincide with the size of the puck M101.

Subsequently, during a period T232 from the frame $t_3$ to the frame $t_4$, the puck M101 is reflected by the wall surface and movement of the puck M101 is changed. In this case, the information processing apparatus 100 predicts that the puck M101 hits against the wall surface in accordance with calculation results of predicted points based on the detected points (for example, detected points P305 and P307). Then, in the example illustrated in FIG. 14, the information processing apparatus 100 increases the size of the display information V115 relative to a previous size (i.e., increases the size relative to the size of the puck M101), in synchronization with the timing at which the puck M101 hits against the wall surface on the basis of a result of the prediction.

Further, a period T233 from the frame $t_5$ to the frame $t_6$ indicates a state after the puck M101 is reflected by the wall surface. In this case, the information processing apparatus 100 may gradually reduce the size of the display information V115 such that the enlarged size of the display information V115 is returned to an original size (i.e., such that the size substantially coincides with the size of the puck M101). Furthermore, in some cases, misalignment between the presentation position of the display information V115 and the position of the puck M101 may occur due to the production of the change of the size of the display information V115. Even in this case, by performing control such that the presentation position of the display information V115 gradually approaches the predicted point, the information processing apparatus 100 is able to correct the misalignment between the presentation position of the display information V115 and the position of the puck M101.

(Fourth Example of Visual Expression: Example of Visual Expression on Environmental Side)

In the examples as described above, exemplary cases have been explained in which the display mode of the display information to be presented is controlled so as to follow the movement of the target object. In contrast, the display information may be presented in a superimposed manner on a surrounding environment (for example, a different object or the like) of the target object, or the display mode of the display information may be controlled in accordance with the estimation result of the movement of the target object.

For example, FIG. 15 is an explanatory diagram for explaining another example of the presentation mode of the information that is presented by the information processing apparatus 100 according to the second modification in accordance with the estimation result of the movement of the target object. In the example illustrated in FIG. 15, an exemplary case is illustrated in which the display information to be presented is controlled so as to be superimposed on a surrounding environment of the target object in accordance with the estimation result of the movement of the target object.

For example, a left figure in FIG. 15 illustrates an exemplary case in which display information is presented in association with a different object, such as a wall surface, other than the target object as if the different object has elasticity. As a more specific example, if it is predicted that the target object hits against the wall surface, the information processing apparatus 100 may control the display mode of the display information that is to be superimposed on the wall surface as if the wall surface has elasticity, in synchronization with a timing at which the target object is located close to the wall surface.

Further, a right figure in FIG. 15 illustrates an exemplary case in which the display information is presented in association with a different object, such as a wall surface, other than the target object as if a repulsive force occurs from the different object. As a more specific example, if it is predicted that the target object hits against the wall surface, the information processing apparatus 100 may control the display mode of the display information that is to be presented near the wall surface as if a repulsive force is generated from the wall surface, in synchronization with a timing at which the target object is located close to the wall surface.

The above-described examples are mere examples, and, of course, do not limit the presentation mode of information in the information processing apparatus 100 according to one embodiment of the present disclosure. As a specific example, when the target object hits against an obstacle, such as a wall surface, it may be possible to cause display information that represents a hit in a produced manner, such as spread of droplets from the obstacle, to be displayed. Further, if the movement of the target object is changed by other than a hit, it may be possible to present information in accordance with the change. As a specific example, if velocity of the target object is reduced, it may be possible to present information that represents reduction of the velocity in a produced manner. As a more specific example, if the velocity of the target object is reduced, it may be possible to control a shape of display information that is presented in a superimposed manner on the target object such that an elastic body, such as a rubber, extends in a direction (i.e., in a rearward direction) opposite to the moving direction of the target object. Further, if an external factor that may reduce the velocity of the target object is present around the target object, it may be possible to present information indicating reduction of the velocity of the target object in association with a position at which the external factor is present. As a specific example, it may be possible to present information indicating inclination, such as a slope, in a place where the velocity of the target object is likely to be reduced (i.e., create an impression that the velocity is reduced).

Thus, as the second modification, the examples of the mode for presenting information in accordance with the estimation result of the movement of the target object have been described above with reference to FIG. 12 to FIG. 15 (i.e., examples of visual expression).

4.3. Third Modification: Example of Control on Estimation of Movement of Target Object As a third modification, as an example of control on movement of a target object, control of selectively switching between the first estimation method and the second estimation method as described above depending on circumstances will be described below.

As described above, in the first estimation method, when movement of the target object is changed in accordance with a surrounding environment of the target object, movement of the target object is estimated based on general laws of physics while taking into account an impact of the environment. Therefore, in the first estimation method, it is also possible to predict future movement of the target object while taking into account a delay due to calculation of predicted points. Meanwhile, in the first estimation method, in a circumstance in which a plurality of external factors that are estimated to affect motion of the target object are present, processes for predicting movement of the target object while taking into account the external factors may become complex, and a circumstance in which accuracy of the prediction is eventually reduced may occur. Further, in some cases, a circumstance in which a part of the external factors does not behave according to general laws of physics due to operation by a user or the like may occur. Even in this case, in the first estimation method, accuracy of prediction of movement of the target object may be reduced.

In contrast, in the second estimation method, a capability to follow movement of the target object is more focused on as compared to the first estimation method. Therefore, in the second estimation method, in some cases, a delay may occur between an adopted predicted point and the target object at a timing at which movement of the target object is changed, such as a timing at which the target object hits against a different object. Such a delay tends to become evident with an increase in velocity of the target object. Meanwhile, in the second estimation method, prediction of the movement of the target object with the surrounding environment taken into account as in the first estimation method (for example, prediction of the movement of the target object after reflection by an obstacle) is limited. Therefore, even in a circumstance in which it is difficult to predict a change of the movement of the target object due to impacts of a plurality of external factors, it is possible to prevent occurrence of a situation in which incorrect prediction is adopted, and it is possible to cause the adopted predicted point to follow the movement of the target object with accuracy. Therefore, even in a case in which a part of external factors does not behave according to general laws of physics due to operation by a user or the like, in the second estimation method, it is possible to cause the adopted predicted point to accurately follow the movement of the target object.

In view of the characteristics as described above, the information processing apparatus 100 according to the third modification selectively switches a process for estimating the movement of the target object between a first process related to the first estimation method and a second process related to the second estimation method depending on circumstances.

For example, FIG. 16 is an explanatory diagram for explaining an example of a method of estimating movement of a target object by the information processing apparatus 100 according to the third embodiment. In the example illustrated in FIG. 16, the information processing apparatus 100 divides a series of regions, in which the movement of the target object is to be detected, into a plurality of partial regions, and selectively switches the process for estimating the movement of the target object for each of the partial regions.

Specifically, in a partial region denoted by a reference symbol R201, the number of external factors, such as obstacles, that are estimated to affect motion of the target object is small, and it is relatively easy to predict a change of the movement of the target object even if the movement of the target object is changed. Therefore, if the target object is located in the partial region R201, the information processing apparatus 100 adopts the above-described first process as the process for estimating the movement of the target object.

In contrast, in partial regions denoted by reference symbols R203a to R203d, wall surfaces that serve as enclosing peripheries have complex shapes, and it is estimated that the movement of the target object is changed in a complex manner due to reflection by the wall surfaces. Therefore, if the target object is located in any of the partial regions R203a to R203d, the information processing apparatus 100 adopts the above-described second process as the process for estimating the movement of the target object.

Further, FIG. 17 is an explanatory diagram for explaining another example of the method of estimating movement of the target object by the information processing apparatus 100 according to the third embodiment. In the example illustrated in FIG. 17, an object M211 having a complex shape is placed inside a region R211 in which the movement of the target object is to be detected In this case, it is estimated that the movement of the target object is changed in a complex manner due to a hit against the object M211. Therefore, the information processing apparatus 100 may adopt the above-described second process as the process for estimating the movement of the target object in a partial region located close to the object M211 in the region R211. Furthermore, the information processing apparatus 100 may adopt the above-described first process as the process for estimating the movement of the target object in a partial region located distant from the object M211 in the region R211.

As described above, the information processing apparatus 100 may determine which of the first process and the second process is to be adopted depending on complexity of the process for estimating the movement of the target object, a degree of a processing load, whether the movement of the target object is eventually predictable, or the like, on the basis of the laws of physics.

The above-described example is of course a mere example, and does not limit switching between the first process and the second process by the information processing apparatus 100 according to the third modification. That is, as long as the information processing apparatus 100 is able to selectively switch the process for estimating the movement of the target object between the first process and the second process depending on various circumstances, conditions for the switching are not specifically limited.

As a specific example, it may be possible to switch the process for estimating the movement of the target object depending on the velocity of the target object. More specifically, it may be possible to adopt the first process if the velocity of the target object is equal to or larger than a threshold, and adopt the second process if the velocity is smaller than the threshold. Furthermore, it may be possible to switch the process for estimating the movement of the target object to any of the first process and the second process in accordance with an instruction from a user. Moreover, it may be possible to determine which of the first process and the second process is to be adopted depending on reliability of the process for estimating the movement of the target object. As a specific example, it may be possible to adopt the second process immediately after, for example, an application is activated because the number of samples of detected points is small and the reliability for the estimation of the movement of the target object tends to be reduced, and, thereafter, the process may be switched to the first process with improvement of the reliability. Moreover, the process for estimating the movement of the target object may be determined depending on the target object. For example, if it is assumed that an air hockey game is adopted as illustrated in FIG. 1, it may be possible to adopt the first process for estimating movement of a puck that moves according to the laws of physics, and adopt the second process for estimating movement of a striker held by a user.

Furthermore, the exemplary case in which the first process and the second process are switched from one to the other has been described above, a list of processes to be switched from one to the other is not specifically limited as long as a plurality of processes including at least one of the first process and the second process are selectively switched depending on circumstances.

Thus, as the third modification, as the example of control on estimation of the movement of the target object, the control of selectively switching between the first estimation method and the second estimation method as described above depending on circumstances has been described above with reference to FIG. 16 and FIG. 17.

5. APPLICATION EXAMPLES

The exemplary case in which the information processing system according to the present embodiment is mainly implemented as what is called an air hockey game system has been described above. Meanwhile, the technology according to the present disclosure is applicable to a system that estimates movement of a predetermined target object and presents information depending on an estimation result of the movement of the target object. Therefore, hereinafter, application examples of the information processing system according to one embodiment of the present disclosure will be described.

5.1. First Application Example: Example of Extension to Three-Dimensional Processes First, as a first application example, an exemplary case in which the process for estimating the movement of the target object and the process for presenting information in accordance with the estimation result by the information processing system according to one embodiment of the present disclosure are extended to three-dimensional processes will be described. Meanwhile, in the present application, an exemplary case in which the information processing system according to the present embodiment is realized by what is called a table tennis game system will be described.

Figure 18:
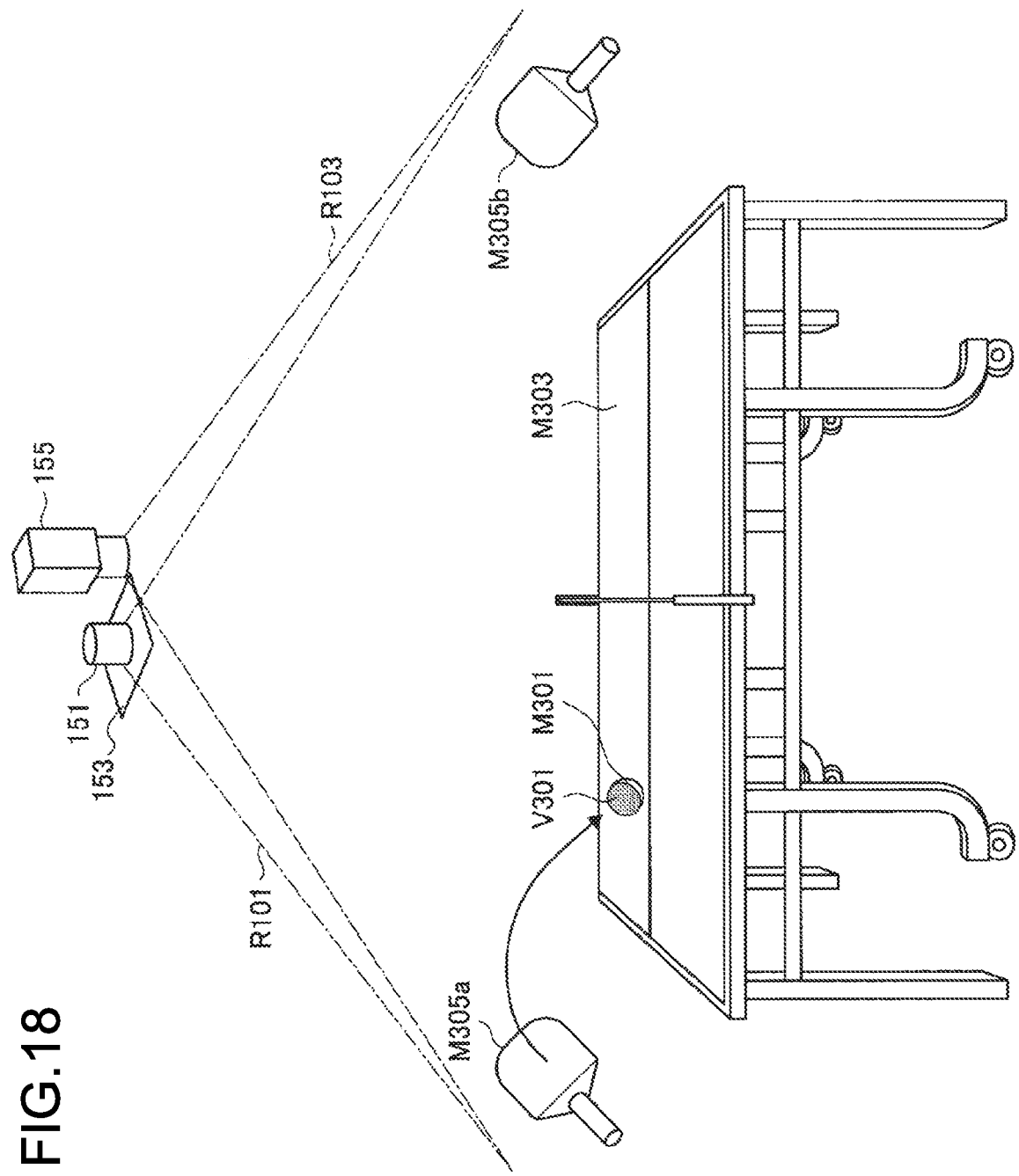
FIG. 18 is an explanatory diagram for explaining an overview of a first application example of the information processing system according to one embodiment.

For example, FIG. 18 is an explanatory diagram for explaining an overview of the first application example of the information processing system according to one embodiment of the present disclosure, and illustrates an example of a schematic system configuration of an information processing system according to the present application example.

In FIG. 18, components denoted by reference symbols 151, 153, and 155 correspond to the imaging unit 151, the projector unit 153, and the output unit 155 illustrated in FIG. 1. That is, the reference symbol R101 schematically denotes the imaging range of the imaging unit 151. Further, the reference symbol R103 schematically denotes the output range of the output unit 155. Furthermore, while not specifically illustrated in FIG. 18, the information processing apparatus 100 in the example illustrated in FIG. 1 is included, and the information processing apparatus 100 controls operation of the imaging unit 151, the projector unit 153, and the output unit 155.

With the configuration as described above, in the example illustrated in FIG. 18, a ball M301 corresponding to what is called a ping-pong ball serves as a target object, and display information is presented in a region including a table-tennis table M303 (i.e., in the output range R103) in accordance with an estimation result of movement of the ball M301. For example, in the example illustrated in FIG. 18, display information V301 is presented in a superimposed manner on the ball M301. Furthermore, in the example illustrated in FIG. 18, the table-tennis table M303 and rackets M305a and M305b are recognized as external factors (i.e., surrounding environments of the ball M301) that are estimated to affect motion of the ball M301 as the target object.

Meanwhile, in the example illustrated in FIG. 18, a position of the ball M301 is changed both in a horizontal direction and in a vertical direction (i.e., in a height direction). Therefore, as a configuration for detecting the position of the ball M301, it may be possible to arrange a component, such as what is called a depth sensor, which detects depth information with respect to the imaging unit 151 and the output unit 155. With this configuration, by detecting a distance from the imaging unit 151 and the output unit 155 to the ball M301, it is possible to also detect the position of the ball M301 in the vertical direction from a detection result of the distance. The same applies to detection of positions of the table-tennis table M303 and the rackets M305a and M305b (in particular, positions in the vertical direction).

With the configuration as described above, an example of a mode for presenting information in accordance with an estimation result of movement of a target object in the information processing system according to the first application example (i.e., an example of visual expression) will be described.

Figure 19:
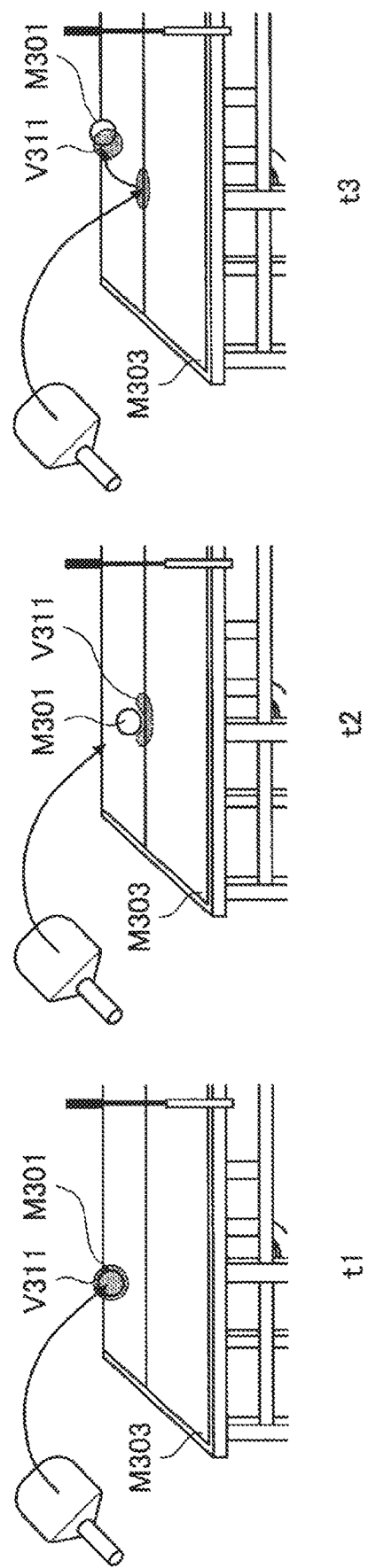
FIG. 19 is an explanatory diagram for explaining an example of a mode for presenting information in accordance with an estimation result of movement of a target object in the information processing system according to the first application example.

For example, FIG. 19 is an explanatory diagram for explaining an example of the mode for presenting information in accordance with the estimation result of the movement of the target object in the information processing system according to the first application example. In the example illustrated in FIG. 19, a situation is illustrated in which the ball M301 as the target object hits against and is reflected (bounces) at a bottom surface of the table-tennis table M303 during a period from a frame $t_1$ to a frame $t_3$. Specifically, in the frame $t_2$, the ball M301 bounces at the bottom surface of the table-tennis table M303, and the frame $t_1$ and the frame $t_3$ indicate timings before and after the bounce.

In the example illustrated in FIG. 19, in the frame $t_1$ before the ball M301 hits against the bottom surface of the table-tennis table M303, display information V311 is presented such that the display information V311 is superimposed on the ball M301. Subsequently, in the frame $t_2$, when the ball M301 hits against the bottom surface of the table-tennis table M303, the display information V311 as described above is temporarily displayed at a position at which the ball M301 hits, in synchronization with the timing of the hit. Then, in the frame $t_3$, when the ball M301 reflected by the bottom surface of the table-tennis table M303 moves so as to be separate from the bottom surface, a presentation position is controlled such that the display information V311 that has been displayed on the bottom surface follows the ball M301 (i.e., in a superimposed manner on the ball M301).

Figure 20:
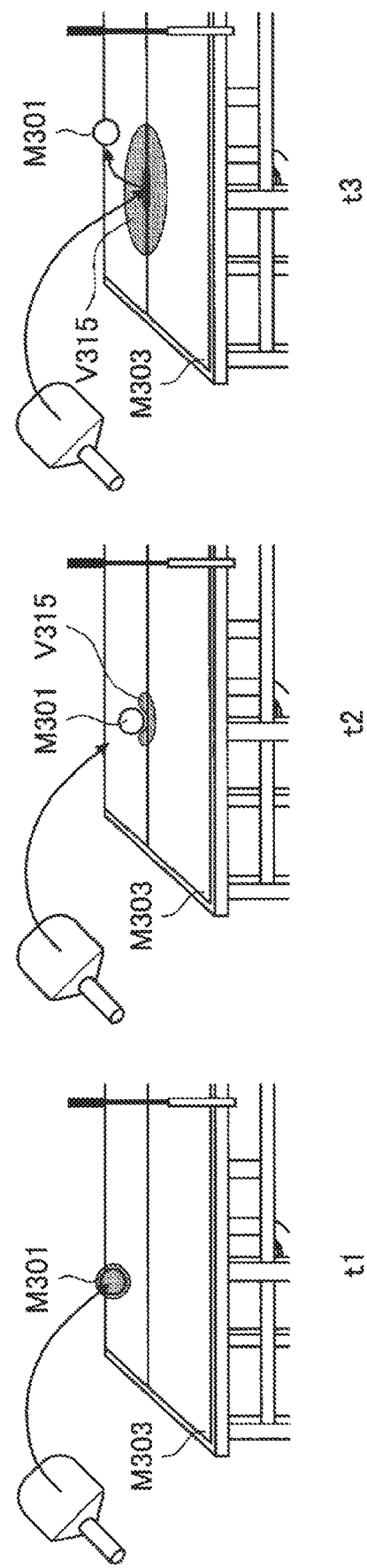
FIG. 20 is an explanatory diagram for explaining another example of the mode for presenting information in accordance with the estimation result of the movement of the target object in the information processing system according to the first application example.

Furthermore, FIG. 20 is an explanatory diagram for explaining another example of the mode for presenting information in accordance with the estimation result of the movement of the target object in the information processing system according to the first application example. In the example illustrated in FIG. 20, similarly to the example illustrated in FIG. 19, a situation is illustrated in which the ball M301 as the target object hits against and is reflected (bounces) at the bottom surface of the table-tennis table M303 during a period from a frame $t_1$ to a frame $t_3$. Specifically, the ball M301 bounces at the bottom surface of the table-tennis table M303 in the frame $t_2$, and the frame $t_1$ and the frame $t_3$ indicate timings before and after the bounce.

In the example illustrated in FIG. 20, in the frame $t_2$, when the ball M301 hits against the bottom surface of the table-tennis table M303, display information V315 is presented at a position at which the ball M301 hits, in synchronization with the timing of the hit. A display mode of the display information V315 is controlled such that, for example, the display information V315 is gradually spread with the lapse of time as if a ripple is generated, and then disappears with the lapse of time.

Figure 21:
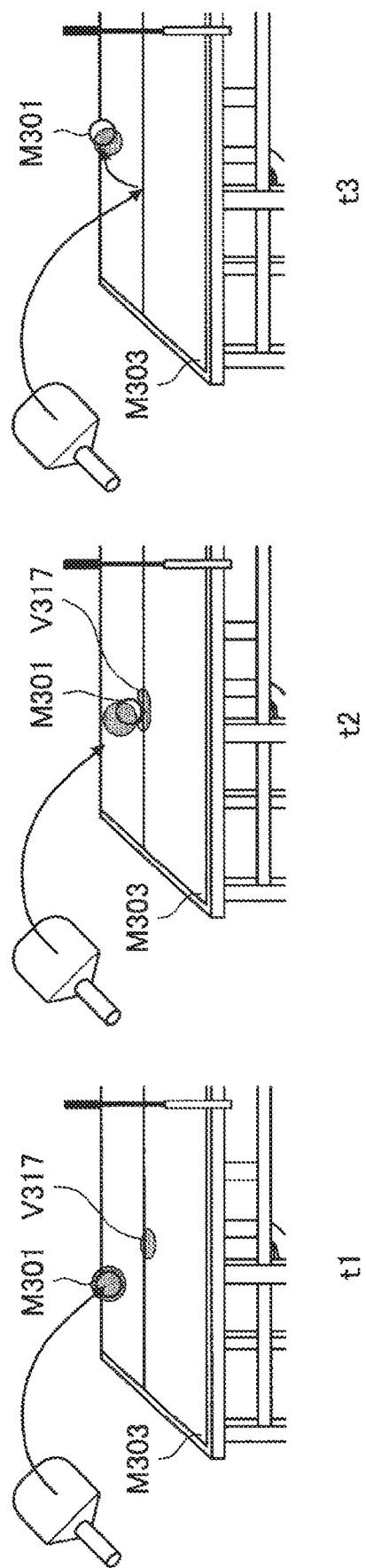
FIG. 21 is an explanatory diagram for explaining still another example of the mode for presenting information in accordance with the estimation result of the movement of the target object in the information processing system according to the first application example.

Moreover, FIG. 21 is an explanatory diagram for explaining still another example of the mode for presenting information in accordance with the estimation result of the movement of the target object in the information processing system according to the first application example. In the example illustrated in FIG. 21, similarly to the example illustrated in FIG. 19, a situation is illustrated in which the ball M301 as the target object hits against and is reflected (bounces) at the bottom surface of the table-tennis table M303 during a period from a frame $t_1$ to a frame $t_3$. Specifically, the ball M301 bounces at the bottom surface of the table-tennis table M303 in the frame $t_2$, and the frame $t_1$ and the frame $t_3$ indicate timings before and after the bounce.

In the example illustrated in FIG. 21, if it is predicted that the ball M301 hits against the bottom surface of the table-tennis table M303, information is presented at a position at which the hit is predicted to occur. For example, in the example illustrated in FIG. 21, in the frame $t_1$, display information V317 is presented at a position at which the ball M301 is predicted to hit on the bottom surface of the table-tennis table M303. The display information V317 is presented until the ball M301 hits against the bottom surface of the table-tennis table M303 as indicated in the frame $t_2$, and the presentation is terminated after the hit has occurred as indicated in the frame $t_3$.

Figure 22:
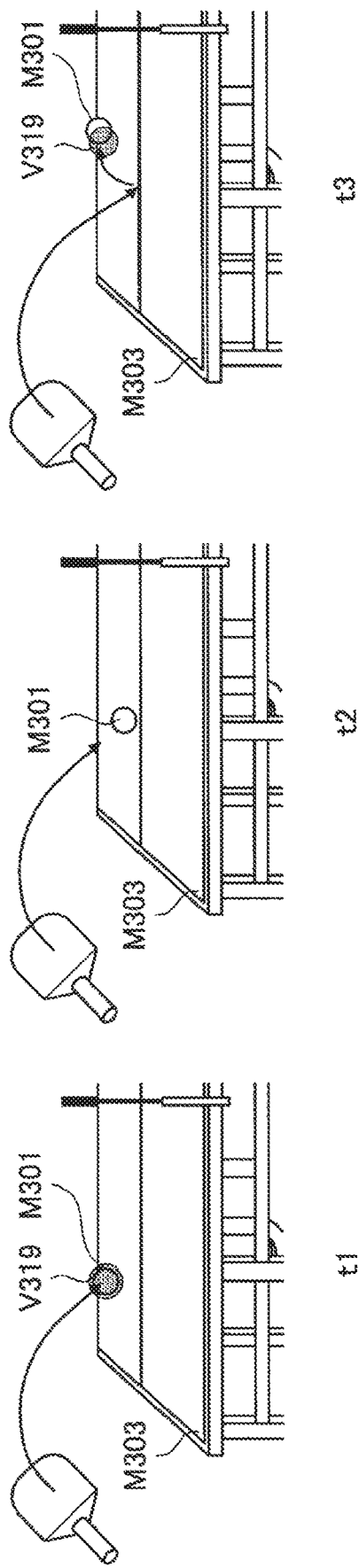
FIG. 22 is an explanatory diagram for explaining still another example of the mode for presenting information in accordance with the estimation result of the movement of the target object in the information processing system according to the first application example.

Furthermore, FIG. 22 is an explanatory diagram for explaining still another example of the mode for presenting information in accordance with the estimation result of the movement of the target object in the information processing system according to the first application example. In the example illustrated in FIG. 22, similarly to the example illustrated in FIG. 19, a situation is illustrated in which the ball M301 as the target object hits against and is reflected (bounces) at the bottom surface of the table-tennis table M303 during a period from a frame $t_1$ to a frame $t_3$. Specifically, the ball M301 bounces at the bottom surface of the table-tennis table M303 in the frame $t_2$, and the frame $t_1$ and the frame $t_3$ indicate timings before and after the bounce.

In the example illustrated in FIG. 22, in the frame $t_1$ before the ball M301 hits against the bottom surface of the table-tennis table M303, display information V319 is presented such that the display information V319 is superimposed on the ball M301. Subsequently, in the frame $t_2$, when the ball M301 hits against the bottom surface of the table-tennis table M303, presentation of the above-described display information V319 is temporarily restricted (for example, the display information V319 is temporarily removed) in synchronization with the timing of the hit. Then, in the frame $t_3$, when the ball M301 reflected by the bottom surface of the table-tennis table M303 moves so as to be separate from the bottom surface, the above-described restriction is cancelled, and the display information V319 is presented again in a superimposed manner on the ball M301.

Meanwhile, the presentation modes of the display information described above with reference to FIG. 19 to FIG. 22 (i.e., visual expressions) are mere examples, and the presentation modes of the information are not specifically limited as long as presentation of information is controlled in accordance with the estimation result of the movement of the ball M301 as the target object. As a specific example, it may be possible to present information in association with the table-tennis table M303 and the rackets M305a and M305b on the basis of the same idea as in the example described above with reference to FIG. 15.

Further, the exemplary case in which the information processing system according to one embodiment of the present disclosure is implemented as a table tennis game system has been described above, application of the information processing system according to the present embodiment is not limited thereto. As a specific example, it may be possible to apply the technology according to the present embodiment to construct systems for other sports and plays, such as billiard, bowling, and putting golf.

Thus, as the first application example, the exemplary case in which the process for estimating the movement of the target object and the process for presenting information in accordance with the estimation result by the information processing system according to one embodiment of the present disclosure are extended to three-dimensional processes has been described above with reference to FIG. 18 to FIG. 22.

5.2. Second Application Example: Example of Application to Handwriting Input System Next, as a second application example, an exemplary case in which the information processing system according to one embodiment of the present disclosure is implemented as what is called a handwriting input system will be described.

Figure 23:
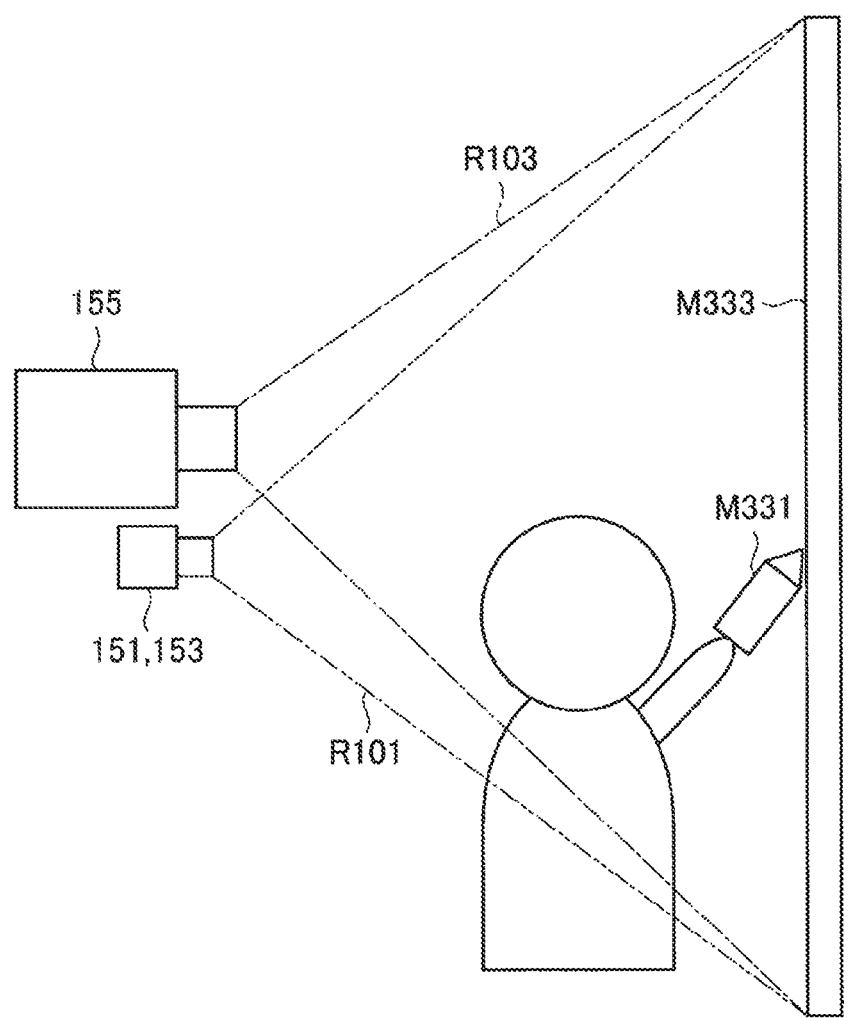
FIG. 23 is an explanatory diagram for explaining an overview of a second application example of the information processing system according to one embodiment.

For example, FIG. 23 is an explanatory diagram for explaining an overview of the second application example of the information processing system according to one embodiment of the present disclosure, and illustrates an example of a schematic system configuration of an information processing system according to the present application example.

In FIG. 23, components denoted by reference symbols 151, 153, and 155 correspond to the imaging unit 151, the projector unit 153, and the output unit 155 in the example illustrated in FIG. 1. That is, the reference symbol R101 schematically denotes the imaging range of the imaging unit 151. Further, the reference symbol R103 schematically denotes the output range of the output unit 155. Furthermore, while not specifically illustrated in FIG. 23, the information processing apparatus 100 in the example illustrated in FIG. 1 is included, and the information processing apparatus 100 controls operation of the imaging unit 151, the projector unit 153, and the output unit 155.

With the configuration as described above, in the example illustrated in FIG. 23, an input device M331, such as what is called a pen or a stylus, for performing handwriting input serves as a target object, and display information is presented on a projection surface of a screen M333 (in other words, in the output range R103) in accordance with an estimation result of movement of the input device M331.

Meanwhile, in the example illustrated in FIG. 23, a light emitting unit that emits infrared light may be arranged in the input device M331 as the target object. In this case, it may be possible to omit the projector unit 153.

Figure 24:
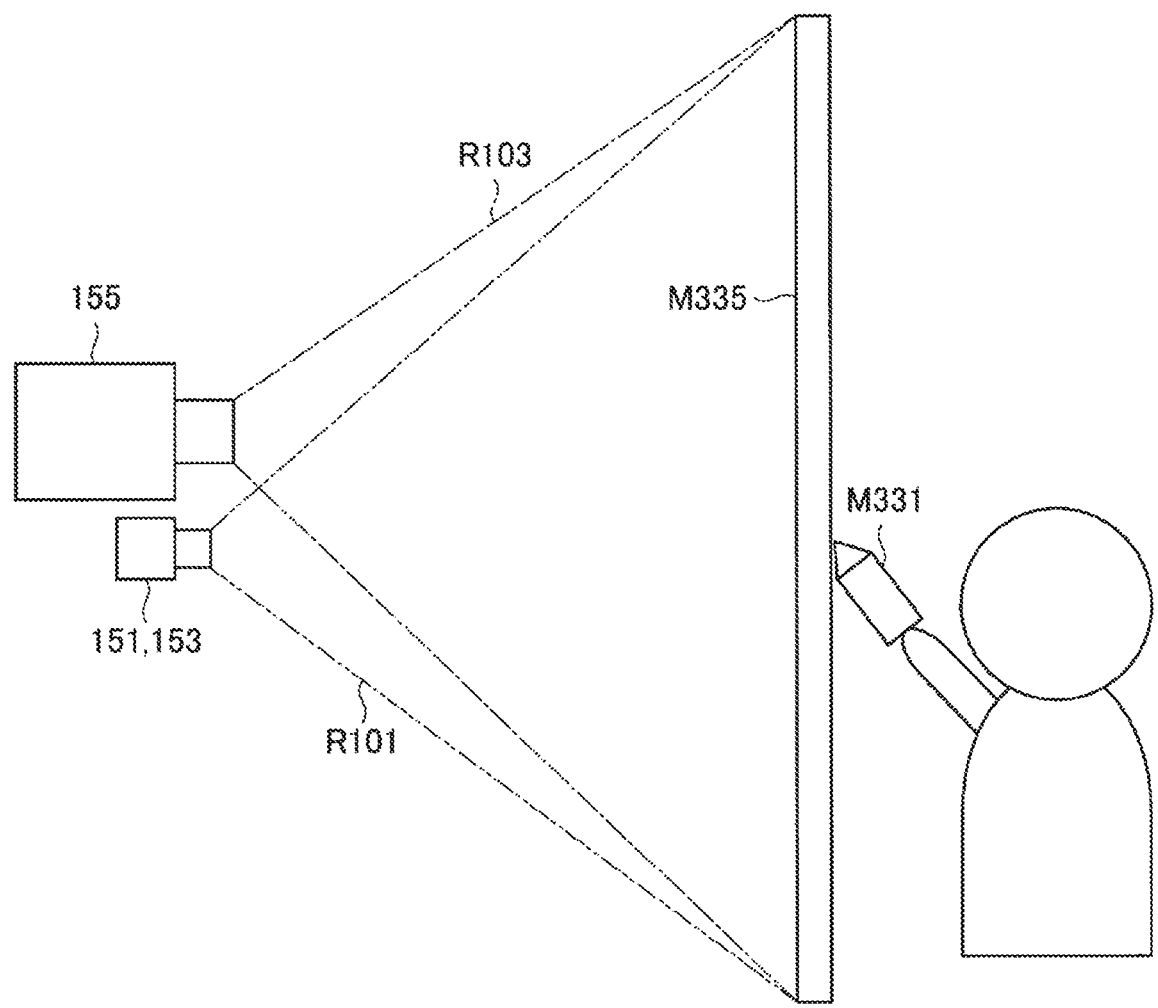
FIG. 24 is an explanatory diagram for explaining another mode of the second application example of the information processing system according to one embodiment.

Furthermore, FIG. 24 is an explanatory diagram for explaining another mode of the second application example of the information processing system according to one embodiment, and illustrates another example of the schematic system configuration of the information processing system according to the present application example. An exemplary case in which the handwriting input system illustrated in FIG. 23 is implemented by what is called a rear-projection system is illustrated. In this case, for example, a screen M335 that transmits infrared light may be applied in place of the screen M333 in the example illustrated in FIG. 23. With this configuration, for example, infrared light that is reflected by the input device M331 (or infrared light that is emitted by the input device M331) can be detected by a detection unit (for example, the imaging unit 151) that is located on a back side of the screen M335.

Thus, the exemplary case in which the information processing system according to one embodiment of the present disclosure is implemented as what is called a handwriting input system has been described above as the second application example with reference to FIG. 23 and FIG. 24.

5.3. Third Application Example: Example of Application to AR Technology

Next, as a third application example, an exemplary case in which the technology according to one embodiment of the present disclosure is applied to an AR technology will be described.

Figure 25:
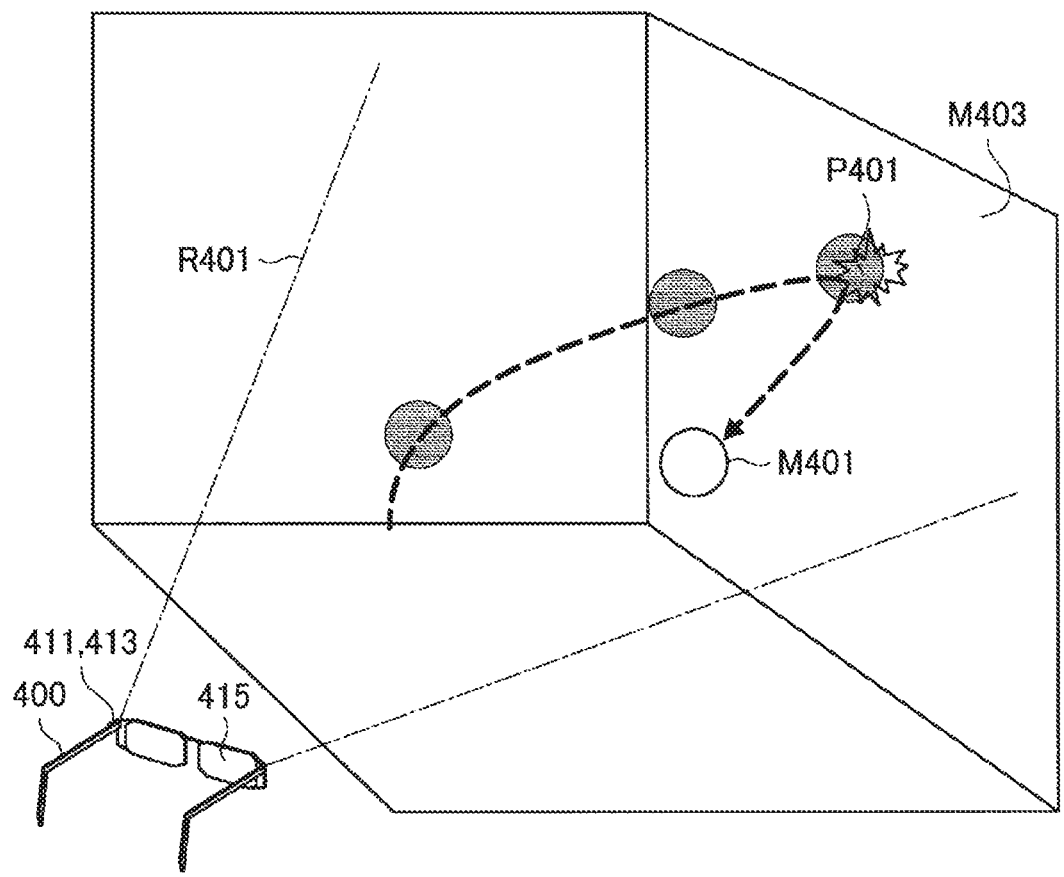
FIG. 25 is an explanatory diagram for explaining an overview of a third application example of the information processing system according to one embodiment.

For example, FIG. 25 is an explanatory diagram for explaining an overview of the third application example of the information processing system according to one embodiment of the present disclosure, and illustrates an example of a schematic system configuration of an information processing system according to the present application example.

As illustrated in FIG. 25, the information processing system according to the third application example includes an input/output device 400. The input/output device 400 is a component that acquires various kinds of input information and presents various kinds of output information to a user who holds the input/output device 400. The input/output device 400 is configured as what is called a head-mounted device that is used in such a manner that a part of the device is worn on at least a part of the head of the user. For example, in the example illustrated in FIG. 25, the input/output device 400 is configured as what is called an eyewear (glasses type) device, and at least one of left and right lenses is configured as a transmissive display (an output unit 415). Further, the input/output device 400 may include an imaging unit 411 and a projector unit 413 as components for acquiring input information related to recognition of an object in a real space. The imaging unit 411 and the projector unit 413 correspond to the imaging unit 151 and the projector unit 153 in the example illustrated in FIG. 1, for example. Furthermore, a region denoted by a reference symbol R401 in FIG. 25 schematically indicates a range in which the input/output device 400 (the imaging unit 411) acquires input information. Meanwhile, as long as it is possible to recognize an object in a real space (in particular, a target object according to the present disclosure), components for the recognition are not limited to the imaging unit 411 and the projector unit 413.

Moreover, the input/output device 400 may be configured to be able to recognize a position and a pose of the input/output device 400 using what is called a self-position estimation technique. Examples of the self-position estimation technique include a technology called SLAM as described above. As long as the input/output device 400 is able to recognize the position and the pose of the input/output device 400 in a real space, a technology applied for the recognition is, of course, not specifically limited, and the configuration of the input/output device 400 may appropriately be changed in accordance with an applied technology.

As described above, with use of the self-position estimation technique for example, the input/output device 400 is able to recognize, as surrounding environments of the input/output device 400, a target object that is located around the input/output device 400 and a different object other than the target object.

Furthermore, in the information processing system according to the present application, it may be possible to include a device (for example, a device corresponding to the information processing apparatus 100 in the example illustrated in FIG. 1) that controls operation of the input/output device 400 and that is able to communicate with the input/output device 400 via a predetermined network, as a device different from the input/output device 400.

With the configuration as described above, for example, in a circumstance in which a video is displayed in a superimposed manner based on the AR technology on a moving object in a real space, it is possible to apply the technology according to one embodiment of the present disclosure as described above. As a more specific example, in the example illustrated in FIG. 25, a ball M401 that moves serves as a target object, and display information is presented on the output unit 415 such that the display information is superimposed on the ball M401 in accordance with an estimation result of movement of the ball M401. Furthermore, in the example illustrated in FIG. 25, a wall surface M403 is recognized as an external factor that is estimated to affect motion of the ball M401 as the target object (i.e., a surrounding environment of the ball M401). For example, in the example illustrated in FIG. 25, a situation is illustrated in which the ball M401 hits against the wall surface M401 at a position P401 on the wall surface M403 and movement of the ball M401 is changed.

Next, an example of a presentation mode of information to a user via the output unit 415 of the input/output device 400 in the information processing system according to the present application will be described.

Figure 26:
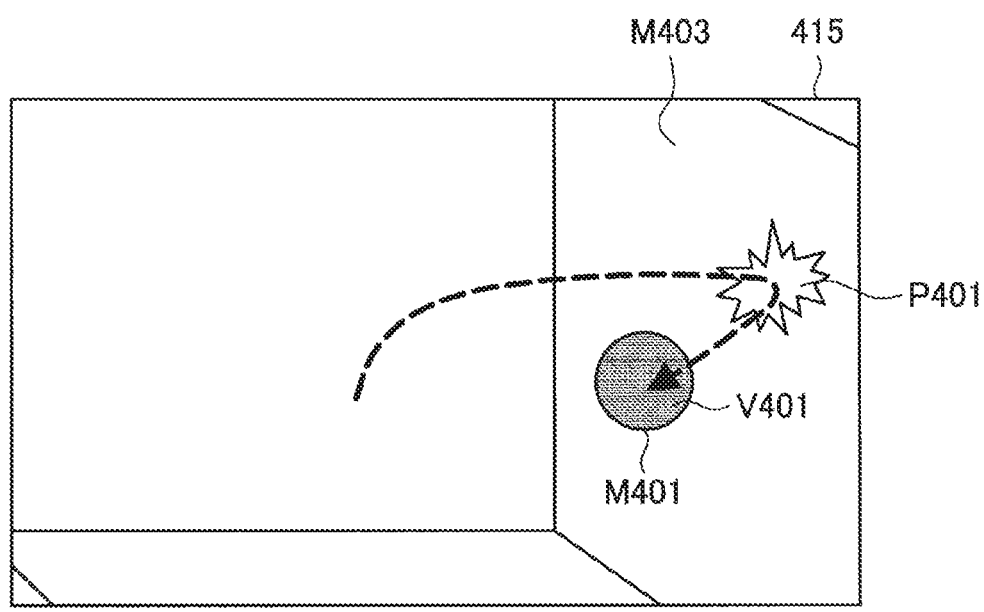
FIG. 26 is an explanatory diagram for explaining an example of information that is viewed by a user in the information processing system according to the third application example.

For example, FIG. 26 is an explanatory diagram for explaining an example of information that is viewed by a user in the information processing system according to the third application example, and illustrates an example of the presentation mode of information in a case in which the first process is applied as the process for estimating the movement of the target object. That is, in the example illustrated in FIG. 26, it is predicted that the ball M401 hits against and is reflected (bounces) at the position P401 on the wall surface M415, and movement of the ball M401 after the reflection is predicted, in accordance with a history of detection results of positions of the ball M401. Then, display information V401 is displayed on the output unit 415 such that the display information V401 is superimposed on the ball M401 in accordance with an estimation result.

Figure 27:
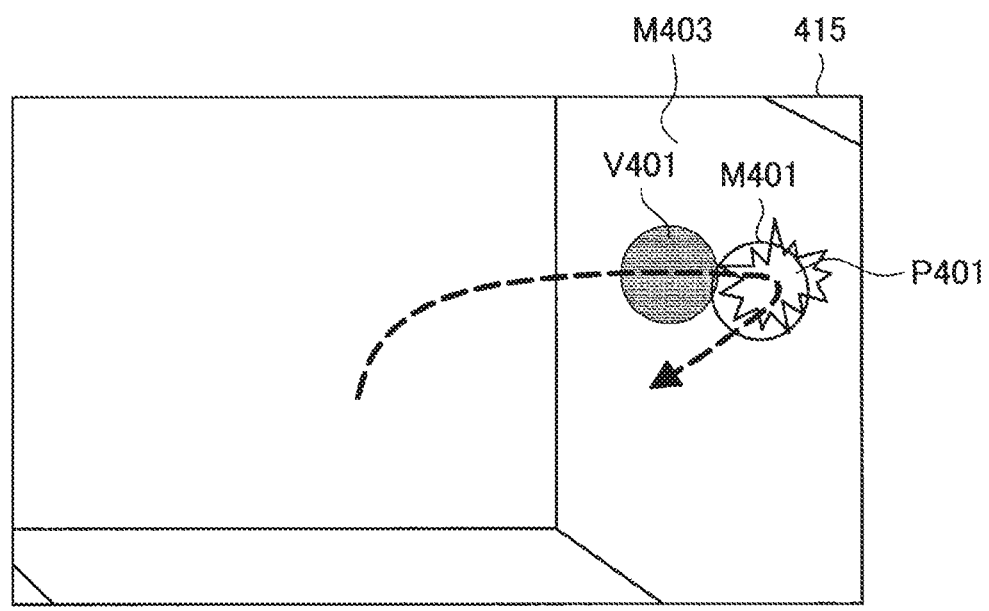
FIG. 27 is an explanatory diagram for explaining another example of information that is viewed by a user in the information processing system according to the third application example.

Furthermore, FIG. 27 is an explanatory diagram for explaining another example of information that is viewed by a user in the information processing system according to the third application example, and illustrates an example of the presentation mode of information in a case where the second process is applied as the process for estimating the movement of the target object. That is, in the example illustrated in FIG. 27, it is predicted that the ball M401 hits against and is reflected (bounced) at the position P401 on the wall surface M415, in accordance with a history of detection results of the positions of the ball M401. Then, the display information V401 is displayed on the output unit 415 with an estimation result taken into account in such a manner that the display information V401 follows the movement of the ball M401 (the display information V401 is eventually superimposed on the ball M401) to prevent occurrence of what is called overshoot.

Furthermore, while detailed explanation is omitted, even in the present application example, similarly to the embodiment, the modifications, and the other application examples as described above, it is possible to apply various kinds of control and various visual expressions.

Thus, the exemplary case in which the technology according to one embodiment of the present disclosure is applied to the AR technology has been described above as the third application example with reference to FIG. 25 to FIG. 27.

6. HARDWARE CONFIGURATION

Figure 28:
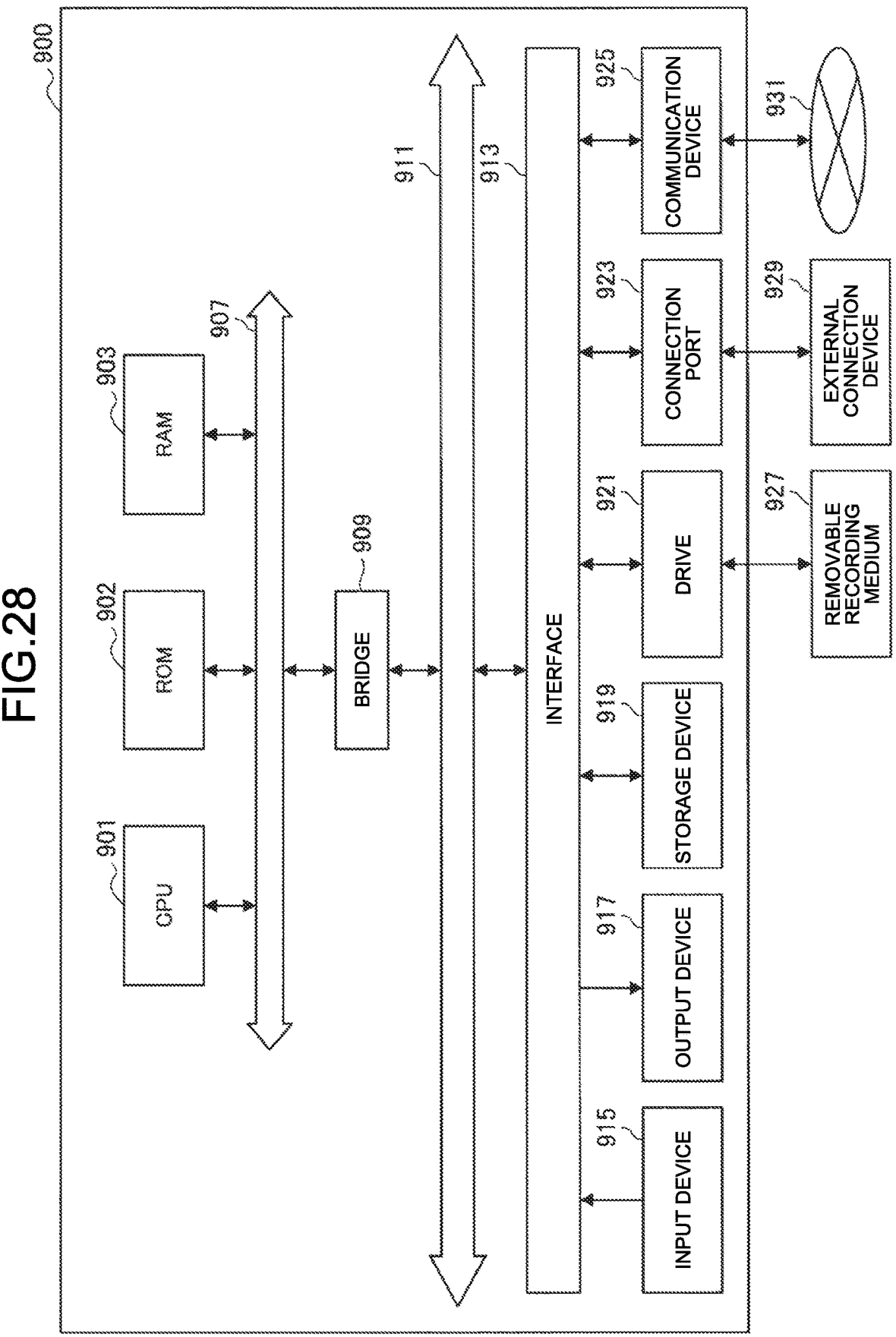
FIG. 28 is a functional block diagram illustrating an example of a hardware configuration of the information processing apparatus according to one embodiment of the present disclosure.

A hardware configuration of an information processing apparatus 900 that is included, like the information processing apparatus 100 as described above, in the information processing system according to the present embodiment will be described below with reference to FIG. 28. FIG. 28 is a functional block diagram illustrating an example of the hardware configuration of the information processing apparatus 900 according to one embodiment of the present disclosure.

The information processing apparatus 900 included in the information processing system 1 according to the present embodiment mainly includes a CPU 901, a ROM 903, and a RAM 905. In addition, the information processing apparatus 900 includes a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device, and controls the whole or a part of operation in the information processing apparatus 900 in accordance with various programs that are stored in the ROM 903, the RAM 905, the storage device 919, or a removable recording medium 927. The ROM 903 stores therein programs used by the CPU 901, calculation parameters, and the like. The RAM 905 temporarily stores therein programs used by the CPU 901, parameters that are appropriately changed in execution of the programs, and the like. The ROM 903 and the RAM 905 are connected to each other via the host bus 907 that is configured with an internal bus, such as a CPU bus. Meanwhile, the collection processing unit 101, the environmental information generation unit 103, the target object detection unit 107, the estimation processing unit 109, and the output control unit 111 that are described above with reference to FIG. 2 are implemented by, for example, the CPU 901.

The host bus 907 is connected to the external bus 911, such as a Peripheral Component Interconnect/Interface (PCI) bus, via the bridge 909. Further, the input device 915, the output device 917, the storage device 919, the drive 921, the connection port 923, and the communication device 925 are connected to the external bus 911 via the interface 913.

The input device 915 is an operation means, such as a mouse, a keyboard, a touch panel, a button, a switch, a lever, and a pedal, which is operated by a user. Further, the input device 915 may be, for example, a remote control means (what is called a remote controller) using infrared light or other radio waves, or may be an external connection device 929, such as a mobile phone or a PDA, which is compatible with the information processing apparatus 900. Furthermore, the input device 915 is configured with an input control circuit that generates an input signal based on information that is used by the user using the above-described operation mans, and outputs the input signal to the CPU 901, for example. The user of the information processing apparatus 900 is able to input various kinds of data and gives an instruction on processing operation to the information processing apparatus 900 by operating the input device 915.

The output device 917 is configured with a device capable of visually or aurally notifying the user of acquired information. Examples of the device as described above include display devices, such as a CRT display device, a liquid crystal display device, a plasma display device, an EL display device, and a lamp, an audio output device, such as a speaker and a headphone, and a printer device. The output device 917 outputs, for example, a result obtained through various kinds of processing performed by the information processing apparatus 900. Specifically, the display apparatus displays a result obtained through various kinds of processing performed by the information processing apparatus 900 by text or an image. In contrast, the audio output device converts an audio signal including replayed voice data, acoustic data, or the like into an analog signal, and outputs the analog signal. Meanwhile, the output unit 155 described above with reference to FIG. 2 may be implemented by, for example, the output device 917.

The storage device 919 is a device for storing data and is configured as one example of a storage unit of the information processing apparatus 900. The storage device 919 is configured with, for example, a magnetic storage device, such as a Hard Disk Drive (HDD), a semiconductor storage device, an optical storage device, a magneto optical storage device, or the like. The storage device 919 stores therein programs executed by the CPU 901, various kinds of data, and the like.

The drive 921 is a reader-writer for a recording medium, and is incorporated in or externally attached to the information processing apparatus 900. The drive 921 reads information that is stored in the attached removable recording medium 927, such as a magnetic disk, an optical disk, a magneto optical disk, or a semiconductor memory, and outputs the information to the RAM 905. Further, the drive 921 is able to write recording to the removable recording medium 927 such as a magnetic disk, an optical disk, a magneto optical disk, or a semiconductor memory. The removable recording medium 927 is, for example, a DVD medium, an HD-DVD medium, a Blu-ray (registered trademark) medium, or the like. Furthermore, the removable recording medium 927 may be a CompactFlash (CF) (registered trademark), a flash memory, a Secure Digital (SD) memory card, or the like. Moreover, the removable recording medium 927 may be, for example, an Integrated Circuit (IC) card on which a contactless IC chip is mounted, an electronic device, or the like. Meanwhile, the storage unit 105 described above with reference to FIG. 2 is implemented by at least one of the RAM 905 and the storage device 919, for example.

The connection port 923 is a port for direct connection to the information processing apparatus 900. Examples of the connection port 923 include a Universal Serial Bus (USB) port, an IEEE 1394 port, and a Small Computer System Interface (SCSI) port. Other examples of the connection port 923 include an RS-232C port, an optical audio terminal, and a High-Definition Multimedia Interface (HDMI) (registered trademark) port. By connecting the external connection device 929 to the connection port 923, the information processing apparatus 900 directly acquires various kinds of data from the external connection device 929 and provide various kinds of data to the external connection device 929.

The communication device 925 is, for example, a communication interface configured with a communication device or the like for connection to a communication network (network) 931. The communication device 925 is, for example, a communication card or the like for a wired or wireless Local Area Network (LAN), Bluetooth (registered trademark), or a Wireless USB (WUSB). Further, the communication device 925 may be a router for optical communication, a router for an Asymmetric Digital Subscriber Line (ADSL), a modem for various kinds of communication, or the like. The communication device 925 is able to transmit and receive signals or the like in accordance with a predetermined protocol, such as TCP/IP, to and from the Internet or other communication devices, for example. Furthermore, the communication network 931 connected to the communication device 925 is configured with a network that is connected in a wired or a wireless manner, and may be, for example, the Internet, a home LAN, infrared communication, radio wave communication, satellite communication, or the like.

Thus, the example of the hardware configuration capable of implementing functions of the information processing apparatus 900 included in the information processing system 1 according to the embodiment of the present disclosure has been described above. Each of the structural elements as described above may be configured using a general purpose member or may be configured by hardware specific to the function of each of the structural elements. Therefore, it is possible to appropriately change the hardware configuration to be used, in accordance with the level of the technology at the time the present embodiment is implemented. Meanwhile, while not illustrated in FIG. 28, various components corresponding to the information processing apparatus 900 included in the information processing system 1 according to the present embodiment are of course included.

Meanwhile, it is possible to create a computer program for implementing each of the functions of the information processing apparatus 900 included in the information processing system 1 according to the present embodiment as described above, and mount the computer program in a personal computer or the like. Furthermore, it is possible to provide a computer readable recording medium in which the computer program as described above is stored. Examples of the recording medium include a magnetic disk, an optical disk, a magneto optical disk, and a flash memory. Moreover, the computer program may be distributed via, for example, a network without using a recording medium. Furthermore, the number of computers that implement the computer program is not specifically limited. For example, a plurality of computers (for example, a plurality of servers or the like) may execute the computer program in a cooperative manner. Meanwhile, a single computer or a plurality of computers that cooperate with one another may also be referred to as a "computer system".

7. CONCLUSION

As described above, the information processing apparatus 100 according to one embodiment of the present disclosure acquires information indicating an estimation result of movement of a predetermined target object in accordance with a history of chronological detection results of positions of the target object and a recognition result of a surrounding environment of the target object. Then, the information processing apparatus 100 causes display information to be displayed in a display mode corresponding to the estimation result. With the configuration as described above, the information processing apparatus 100 according to the present embodiment is able to present information to a user while taking into account, for example, a change of the movement of the target object in accordance with the surrounding environment of the target object. As a more specific example, if it is estimated that the movement of the target object is changed due to an external factor, such as an obstacle or an external force, the information processing apparatus 100 is able to present a video that represents a change of the movement in a produced manner to the user in synchronization with the change of the movement of the target object. In this manner, the information processing apparatus 100 according to the present embodiment is able to provide a more preferred experiment to the user.

While the preferred embodiments of the present disclosure have been described in detail above with reference to the accompanying drawings, the technical scope of the present disclosure is not limited to the examples as described above. It is obvious that a person skilled in the technical field of the present disclosure may conceive various alternations and modifications within the scope of the appended claims, and it should be understood that they will naturally come under the technical scope of the present disclosure.

For example, a configuration of the output unit for presenting information to a user is not specifically limited. As a specific example, a display device like what is called a general display may be used as the output unit. In this case, for example, if a target object is placed on a table-top type display, it is possible to cause a video to be displayed at a desired position on the display in accordance with a position or movement of the target object. Furthermore, the information presented to the user is not limited to the display information such as a video. As a specific example, if the movement of the target object is changed in accordance with a hit against a different object or the like, it may be possible to present audio, such as a sound effect or voice, or present a tactile sense or a kinesthetic sense by vibration or the like, in synchronization with a timing at which the movement of the target object is changed. Moreover, if the target object moves toward a predetermined position (for example, a position of a user), it may be possible to present various kinds of information as described above in accordance with an approaching condition of the target object.

Furthermore, a circumstance in which a surrounding environment of the target object is dynamically changed may occur. In this case, it is satisfactory to recognize a surrounding environment of the target object in real time, and apply a recognition result of the environment to the process for estimating the movement of the target object. Moreover, as described above, in some cases, a position or a pose of a device for recognizing the movement of the target object (for example, an imaging unit or the like) or a device for presenting information to the user (for example, an output unit or the like) may be changed. In this case, it is satisfactory to estimate a self-position of the device as described above (i.e., the imaging unit or the output unit), and dynamically recognize a surrounding environment of the device (eventually, the surrounding environment of the target object) in accordance with an estimation result of the self-position.

Furthermore, the method of estimating the movement of the target object, a configuration for acquiring information for the estimation, and the like are not specifically limited. As a specific example, by arranging various sensors (for example, a vibration sensor or the like) on a different object, such as an obstacle, other than the target object, a hit of the target object against the different object may be detected based on a detection result of the sensor. Moreover, it may be possible to determine that the target object hits against a different object when a sound collection unit, such as a microphone, collects a hitting sound from the surrounding environment. Furthermore, it may be possible to control a region in which the sound collection unit collects a hitting sound by controlling directionality of the sound collection unit. With this configuration, it is possible to estimate a position at which the target object and a different object hit against each other, in accordance with an installation position of the sound collection unit that has collected the hitting sound.

In addition, the effects described in this specification are merely illustrative or exemplified effects, and are not limitative. That is, with or in the place of the above effects, the technology according to the present disclosure may achieve other effects that are clear to those skilled in the art from the description of this specification.

Meanwhile, the following configurations are also within the technical scope of the present disclosure.

(1)

An information processing apparatus comprising:

an acquisition unit configured to acquire information indicating an estimation result of movement of a predetermined target object in accordance with a history of chronological detection results of positions of the target object and a recognition result of a surrounding environment of the target object; and a control unit configured to cause display information to be presented in a display mode corresponding to the estimation result.

(2)

The information processing apparatus according to (1), further comprising:

an estimation unit configured to estimate the movement of the target object in accordance with a history of chronological detection results of positions of the target object and a recognition result of the environment.

(3)

The information processing apparatus according to (2), wherein the estimation unit predicts future movement of the target object in accordance with the recognition result of the environment, and the control unit causes the display information to be presented in a display mode corresponding to a result of the prediction.

(4)

The information processing apparatus according to (3), wherein the estimation unit predicts future movement of the target object in accordance with a recognition result of an external factor that is estimated to affect motion of the target object.

(5)

The information processing apparatus according to (4), wherein the estimation unit predicts future movement of the target object in accordance with at least one of a positional relationship between the target object and a different object, a friction force that acts on the target object, and an external force that acts on the target object.

(6)

The information processing apparatus according to (5), wherein if it is predicted that the target object and the different object hit against each other, the estimation unit predicts future movement of the target object in accordance with an estimation result of a change of a motion direction of the target object due to the hit.

(7)

The information processing apparatus according to any one of (3) to (6), wherein the estimation unit selectively switches between a first process and a second process, the first process being a process for predicting future movement of the target object in accordance with the recognition result of the environment, the second process being a process for controlling a chronological range related to estimation of movement of the target object at and after a detection timing of a position of the target object, in accordance with a detection result of the position of the target object and the recognition result of the environment.

(8)

The information processing apparatus according to (7), wherein the estimation unit selectively switches between the first process and the second process in accordance with a positional relationship between the target object and a different object.

(9)

The information processing apparatus according to (2), wherein the estimation unit controls a chronological range related to estimation of movement of the target object at and after a detection timing of a position of the target object, in accordance with a detection result of the position of the target object and the recognition result of the environment.

(10)

The information processing apparatus according to (9), wherein the estimation unit limits a chronological range related to estimation of the movement of the target object at and after the detection timing, in accordance with at least one of a positional relationship between the target object and a different object, a frictional force that acts on the target object, and an external force that acts on the target object.

(11)

The information processing apparatus according to (10), wherein if it is estimated that the target object hits against a different object, the estimation unit limits a chronological range related to estimation of the movement of the target object to a range corresponding to a timing at and before a timing at which the hit is estimated to occur.

(12)

The information processing apparatus according to any one of (1) to (11), wherein the control unit causes the display information to be presented at a position corresponding to the estimation result.

(13)

The information processing apparatus according to any one of (1) to (12), wherein the control unit causes the display information to be superimposed on the target object in accordance with the estimation result.

(14)

The information processing apparatus according to any one of (1) to (13), wherein the control unit causes the display information to be presented at a position at which the target object is estimated to arrive at a later time, in accordance with the estimation result.

(15)

The information processing apparatus according to any one of (1) to (14), wherein the control unit controls, as the display mode, at least one of a size, a color, and a shape of the display information.

(16)

The information processing apparatus according to any one of (1) to (15), wherein the control unit controls the display mode in synchronization with movement of the target object in accordance with the estimation result.

(17)

The information processing apparatus according to (16), wherein the control unit controls the display mode in accordance with an estimation result of a change of motion of the target object.

(18)

The information processing apparatus according to any one of (1) to (12), wherein the control unit causes the display information to be presented in accordance with an external factor that is estimated to affect motion of the target object, on the basis of the estimation result.

(19)

The information processing apparatus according to any one of (1) to (18), wherein the control unit controls an operation of a projection unit that projects the display information.

(20)

The information processing apparatus according to any one of (1) to (18), wherein the information processing apparatus comprising at least any one of a detection unit that sequentially detects a position of the target object, and a recognition unit that recognizes the environment.

(21)

The information processing apparatus according to (20), wherein the detection unit detects the position of the target object by applying light with a predetermined wavelength to an inside of a predetermined region and detecting the light reflected by the target object.

(22)

An information processing method implemented by a computer, the information processing method comprising:

acquiring information indicating an estimation result of movement of a predetermined target object in accordance with a history of chronological detection results of positions of the target object and a recognition result of a surrounding environment of the target object; and causing display information to be presented in a display mode corresponding to the estimation result. (23)

A recording medium storing a program that causes a computer to execute:

acquiring information indicating an estimation result of movement of a predetermined target object in accordance with a history of chronological detection results of positions of the target object and a recognition result of a surrounding environment of the target object; and causing display information to be presented in a display mode corresponding to the estimation result.

REFERENCE SIGNS LIST

1 information processing system
100 information processing apparatus
101 collection processing unit 103 environmental information generation unit
105 storage unit
107 target object detection unit
109 estimation processing unit
111 output control unit
151 imaging unit
153 projector unit
155 output unit

The invention claimed is:

1. An information processing apparatus, comprising:
a Central Processing Unit (CPU) configured to:
control recognition of a surrounding environment of a target object to obtain a recognition result;
detect a first position of the target object to obtain a detection result;
switch between a first process and a second process to predict a movement of the target object;
predict, in the first process, the movement of the target object based on:
a history of chronological detection results of a plurality of positions of the target object, and
the recognition result of the surrounding environment of the target object;
control, in the second process, a chronological range related to the prediction of the movement of the target object at a detection timing of the detection of the first position of the target object and after the detection timing,
wherein the chronological range is controlled based on the detection result and the recognition result;
predict, in the second process, the movement of the target object each of at the detection timing and after the detection timing based on:
the control of the chronological range, and
the history of the chronological detection results of the plurality of positions of the target object; and
control presentation of display information in a display mode, wherein the display mode corresponds to one of:
the predicted movement of the target object in the first process, or
the predicted movement of the target object in the second process.

2. The information processing apparatus according to claim 1, wherein the CPU is further configured to:
control recognition of an external factor that is estimated to affect motion of the target object; and
predict the movement of the target object based on the recognition of the external factor.

3. The information processing apparatus according to claim 2, wherein the CPU is further configured to predict the movement of the target object based on at least one of:
a positional relationship between the target object and a specific object, wherein the specific object is different from the target object,
a friction force that acts on the target object, or
an external force that acts on the target object.

4. The information processing apparatus according to claim 3, wherein the CPU is further configured to:
predict a collision of the target object with the specific object;
estimate a change of a motion direction of the target object based on the predicted collision; and
predict the movement of the target object based on the estimated change of the motion direction of the target object.

5. The information processing apparatus according to claim 1, wherein
the CPU is further configured to switch between the first process and the second process based on positional relationship between the target object and a specific object, and
the specific object is different from the target object.

6. The information processing apparatus according to claim 1, wherein
the CPU is further configured to limit the chronological range related to the prediction of the movement of the target object at the detection timing and after the detection timing,
the chronological range is limited based on at least one of a positional relationship between the target object and a specific object, a frictional force that acts on the target object, or an external force that acts on the target object, and
the specific object is different from the target object.

7. The information processing apparatus according to claim 6, wherein the CPU is further configured to:
estimate a collision of the target object with the specific object; and
limit the chronological range related to the prediction of the movement of the target object to a range corresponding to a timing at which the collision is estimated to occur and before the timing at which the collision is estimated to occur.

8. The information processing apparatus according to claim 1, wherein the CPU is further configured to control the presentation of the display information at a second position corresponding to one of:
the predicted movement of the target object in the first process, or
the predicted movement of the target object in the second process.

9. The information processing apparatus according to claim 1, wherein the CPU is further configured to control superimposition of the display information on the target object based on one of:
the predicted movement of the target object in the first process, or
the predicted movement of the target object in the second process.

10. The information processing apparatus according to claim 1, wherein
the CPU is further configured to:
estimate arrival of the target object at a second position at a specific time; and
control the presentation of the display information at the second position based on one of:
the predicted movement of the target object in the first process, or
the predicted movement of the target object in the second process.

11. The information processing apparatus according to claim 1, wherein the CPU is further configured to control, as the display mode, at least one of a size, a color, or a shape of the display information.

12. The information processing apparatus according to claim 1, wherein the CPU is further configured to control the display mode in synchronization with one of:
the predicted movement of the target object in the first process, or
the predicted movement of the target object in the second process.

13. The information processing apparatus according to claim 12, wherein the CPU is further configured to:
  estimate a change in a motion of the target object to obtain an estimation result; and
  control the display mode based on the estimation result of the change of the motion of the target object.

14. The information processing apparatus according to claim 1, wherein the CPU is further configured to:
  control recognition of an external factor that is estimated to affect a motion of the target object; and
  control the presentation of the display information based on:
    the external factor that is estimated to affect the motion of the target object, and
    one of the predicted movement of the target object in the first process or the predicted movement of the target object in the second process.

15. An information processing method, comprising:
  controlling recognition of a surrounding environment of a target object to obtain a recognition result;
  detecting a position of the target object to obtain a detection result;
  switching between a first process and a second process to predict a movement of the target object;
  predicting, in the first process, the movement of the target object based on:
    a history of chronological detection results of a plurality of positions of the target object, and
    the recognition result of the surrounding environment of the target object;
  controlling, in the second process, a chronological range related to the prediction of the movement of the target object at a detection timing of the detection of the position of the target object and after the detection timing,
    wherein the chronological range is controlled based on the detection result and the recognition result;
  predicting, in the second process, the movement of the target object each of at the detection timing and after the detection timing based on:
    the control of the chronological range, and
    the history of the chronological detection results of the plurality of positions of the target object; and
  controlling presentation of display information in a display mode, wherein the display mode corresponds to one of:
    the predicted movement of the target object in the first process, or
    the predicted movement of the target object in the second process.

16. A non-transitory computer-readable medium having stored thereon, computer-executable instructions, which when executed by a computer, cause the computer to execute operations, the operations comprising:
  controlling recognition of a surrounding environment of a target object to obtain a recognition result;
  detecting a position of the target object to obtain a detection result;
  switching between a first process and a second process to predict a movement of the target object;
  predicting, in the first process, the movement of the target object based on:
    a history of chronological detection results of a plurality of positions of the target object, and
    the recognition result of the surrounding environment of the target object;
  controlling, in the second process, a chronological range related to the prediction of the movement of the target object at a detection timing of the detection of the position of the target object and after the detection timing,
    wherein the chronological range is controlled based on the detection result and the recognition result;
  predicting, in the second process, the movement of the target object each of at the detection timing and after the detection timing based on:
    the control of the chronological range, and
    the history of the chronological detection results of the plurality of positions of the target object; and
  controlling presentation of display information in a display mode, wherein the display mode corresponds to one of:
    the predicted movement of the target object in the first process, or
    the predicted movement of the target object in the second process.

17. An information processing apparatus, comprising:
  a Central Processing Unit (CPU) configured to:
    control recognition of a surrounding environment of a target object to obtain a recognition result;
    detect a position of the target object to obtain a detection result;
    estimate a collision of the target object with a specific object, wherein the specific object is different from the target object;
    limit a chronological range related to estimation of a movement of the target object to a range corresponding to a timing at which the collision is estimated to occur and before the timing at which the collision is estimated to occur,
      wherein the chronological range is limited based on the detection result, the recognition result, and at least one of a positional relationship between the target object and the specific object, a frictional force that acts on the target object, or an external force that acts on the target object;
    estimate the movement of the target object based on the limited chronological range, a history of chronological detection results of a plurality of positions of the target object, and the recognition result; and
    control presentation of display information in a display mode, wherein the display mode corresponds to an estimation result of the estimation of the movement of the target object.

* * * * *